(12) United States Patent
Tonnison

(10) Patent No.: US 10,572,917 B2
(45) Date of Patent: *Feb. 25, 2020

(54) GENERATION ONLINE E-COMMERCE AND NETWORKING SYSTEM FOR TRANSFORMING NON-DYNAMIC WISH LIST INTO DYNAMIC WISH LIST JOINT FULFILLMENT TO IMPROVE SOCIAL COMMERCE

(71) Applicant: Wenxuan Tonnison, Fort Worth, TX (US)

(72) Inventor: Wenxuan Tonnison, Fort Worth, TX (US)

( * ) Notice: Subject to any disclaimer, the term of this patent is extended or adjusted under 35 U.S.C. 154(b) by 196 days.

This patent is subject to a terminal disclaimer.

(21) Appl. No.: 15/666,669

(22) Filed: Aug. 2, 2017

(65) Prior Publication Data

US 2017/0330253 A1 Nov. 16, 2017

Related U.S. Application Data

(62) Division of application No. 12/460,488, filed on Jul. 20, 2009, now Pat. No. 9,779,434.

(51) Int. Cl.
*G06Q 30/00* (2012.01)
*G06Q 30/06* (2012.01)
*G06Q 30/02* (2012.01)

(52) U.S. Cl.
CPC ............ *G06Q 30/06* (2013.01); *G06Q 30/02* (2013.01); *G06Q 30/0222* (2013.01); *G06Q 30/0248* (2013.01); *G06Q 30/0253* (2013.01); *G06Q 30/0257* (2013.01); *G06Q 30/0276* (2013.01); *G06Q 30/0605* (2013.01)

(58) Field of Classification Search
USPC .......................................... 705/14.11, 14.73
See application file for complete search history.

(56) References Cited

U.S. PATENT DOCUMENTS

2004/0148228 A1\* 7/2004 Kwei .................... G06Q 30/06
705/26.4

\* cited by examiner

*Primary Examiner* — Sun M Li
(74) *Attorney, Agent, or Firm* — Bond, Schoeneck & King, PLLC; Frederick Price; George McGuire

(57) ABSTRACT

Methods, systems and programs are disclosed for facilitating dynamic online wish fulfillment and for transforming non-interactive assets into user-interactive assets. Such methods, systems and programs are to effectively increase online purchasing activities through joint wish fulfillment, as well as to effectively address low membership reach rates of websites and poor online advertising response rates through seamlessly integrating digital currency and dynamic online wish fulfillment with online sponsor advertisements to empower Internet users to conduct more online shopping, control online advertisement display, and to have a say and stake in the online advertising process. These are revolutionary technologies to disrupt the traditional non-dynamic wish fulfillment and non-user-participated online advertising technologies to improve social commerce and deep penetration of digital currency, to dramatically increase Internet usage and to create a win-win situation for all parties involved.

18 Claims, 22 Drawing Sheets

HOTTERRAIN

Home | My Account | My Profile | Wish Lists | Mail Center | Assets | Groups | HT Money | HT Market | HT Mall | My Friends/Family | Tell a Friend/Family | Search HT Members | Sponsors | Developers | Options ◄ | Blog | Privacy | Help | Logout

*Welcome, Mary Smith!*

Search [____] Go

Sponsors:

HT150 offered by Wendy's. Request sponsorship. Lunch starts at $2.00 only. See more info at www.wendys.com HT500 offered by Google. Request sponsorship. Google Doc applications are available for free usage. See more at www.google.com

*You will obtain HT1 for clicking a Google Ad (Daily maximum HT10)*

Ads by Google

Indian Jewelry 50-75% off designer fashion. Manufacturer direct. www.jjewelry.com Jewelry at Zales Elegant jewelry to fit your budget. Free shipping over $149 at Zales www.zales.com More

Mary Smith's Profile

| Picture of Mary Smith | |
| --- | --- |
| Rating: 9.8 | |
| 30 People rated me | |

Welcome to Mary's HotTerrain Page

Name: Mary Smith    City: Syracuse, NY    Sex: Female    Age: 23

About me: I have been a teacher for two years and I enjoyed interacting and coaching my students. A few of them were a bit difficult to deal with initially. I was able to meet with them after classes and listened to their issues and problems. After a year of hard work and coaching, they changed their attitude and realized the importance of getting themselves prepared for the future. That's my job and I like to make a difference in teenagers' lives.

My hobbies: I like to collect different kind of jewelries and keep photo albums of them.

My Friends: I have 56 friends

Linda Matuzak: *21 minutes ago.* Hi, all, I find this link very useful, please check it out www.abc123.com Jerry Chan: *3 hours ago.* Dear all, I will be on vacation tomorrow and will get back to you later. Cheers!

More

[Edit]    *902*

I joined 6 communities.

eStamp fan: 560,732 members
Red Socks: 378,988 members
Heart Association: 266,513 members
Hiking: 37,879 members
Teachers: 64,211 members More

My Blogs: I have 3 blogs

Trip to Florida: *posted 2 days ago.* Recently I visited Tempa, Florida and met with......

Annual Training: *posted 3 days ago.* Is annual training to maintain your professional certification......

Cat Fight: posted 5 days ago. The other day, I was walking towards my house and saw......

View Blogs | Add Entry

HotTerrain © 2008    *901*

About HotTerrain | Advertisers | Developers | Businesses | Terms | Privacy | Community Standards | Help | Contact Us

FIG. 17

HOTTERRAIN

Invite your family members (earn HT 10 for every family member invited. These people have "Top Secret" view of your profile and wish list by default):

Father's Email: [____]     Mother's Email: [____] *1701*

Brother's Email: [____]    Sister's Email: [____] *1702*

Uncle's Email: [____]      Grandfather's Email: [____]

Add more family members

Invite your close friends (earn HT 10 for every friend invited. They have "Top Secret" view of your profile and wish list by default):

Friend's Email: [____]     Friend's Email: [____] *1703*

Add more friends

Invite Others (earn HT 10 for every co-worker or acquaintance invited. They have "Secret" view of your profile by default):

Co-worker's Email: [____]  Acquaintance's Email: [____] *1705*

Add more co-workers    Add more acquaintances    Add more online community members

[Send Invite] *1704*

<u>Invite later and proceed to submit registration</u>

Advertisements [____]

HotTerrain © 2008 - 2009

FIG. 18

H❂TTERRAIN

Home | My Account | My Profile | Wish Lists | Virtual Mail | Assets | Groups | HT Money | HT Market | HT Mall | My Friends/Family | Tell a Friend/Family | Sponsors | Developers | Blog | Help | Logout |

[Search]    *Welcome, Mary Smith!*    *1801*

Wish Fulfillment Status

Linda Matuzak's Wish #2: Stone Mountain Capetown Shoulder Bag -- In Stock

Seller: Stone Mountain Inc.    *Gold Member*    Positive Feedback: 367 of 388 or 95% positive Affiliate since: 2/22/2008    Price: $100 or HT10,000

Remaining Balance: $40 or HT4,000    Date Remaining Balance Due: 7/31/2008 (11 days left)

| Name | Fulfillment Status | Date | Payment Method | Action Required |
|---|---|---|---|---|
| Jim Cleaner | Approved | 7/15/08 | Paid by HT Money | None |
| Loraine Arsen | Approved | 7/15/08 | Paid by Credit Card | None |
| Joe Blowe | Pending | 7/20/08 (Today) | N/A | Send Reminder<br>Cancel Request<br>Request Someone else |
| Tina Dai | Approved | 7/17/08 | Paid by PayPal | None |
| Myself | Pending | 7/20/08 (Today) | N/A | Pay Now |

Message from Seller: Shipment occurs upon receipt of the full payment.

Ads

HotTerrain © 2008 - 2009

About HotTerrain | Terms | Privacy | Help | Contact Us

FIG. 19

HO🔥TERRAIN

Search: [          ] Go

Home | My Account | Options ▼ | Blog | Privacy | Support    Log out

Services:
My Profile
Wish List
Inbox
My Assets
Groups
Free Assets
HT Money
HT Market
HT Mall
Sponsors
Developers

| Home | Free Assets | Post Free Assets |

Free eStamps:                                                 *1901*
☐                    ☐                      ☐            More Free eStamps
UPC: 1-S7-11        UPC: 1-S1-50           UPC: 1-S7-132    Daily Maximum: 10
                                                              Add to My Assets

Free eItems:                                                  *1902*
☐                    ☐                      ☐            More Free eItems
UPC: 1-1-22         UPC: 1-3-18-45   UPC: 1-4-24-57   UPC: 1-5-35-83  UPC: 1-6-40-36    Daily Maximum: 10
                                                              Add to My Assets

Free Physical Items:
Used        Provided by: Ubidu                    Provided by: Steve Li   UPC: 867-25-356-1
iRobot      UPC: 22-8-161-23  Value: $20          Condition: used and in great shape
            Condition: used and in okay shape     Location: Syracuse, NY  Value: $10
            Location: Customer Service of         Shipping: US$5 or HT500 (within USA)
            WalMart Oneida, NY store              Arrange Pickup
            Arrange Pickup More Free Physical Items
                                                              *1904*
*1903*

HotTerrain © 2008 - 2009

About HotTerrain | Advertisers | Developers | Businesses | Terms | Privacy | HotTerrainSoft
                | Community Standards | Help | Contact Us ads

*1905* points to the "Free Assets" tab

GENERATION ONLINE E-COMMERCE AND NETWORKING SYSTEM FOR TRANSFORMING NON-DYNAMIC WISH LIST INTO DYNAMIC WISH LIST JOINT FULFILLMENT TO IMPROVE SOCIAL COMMERCE

CROSS-REFERENCE TO RELATED APPLICATIONS

This application is a divisional of and claims the benefit of U.S. application Ser. No. 12/460,488, filed on Jul. 20, 2009, the entire contents of which are hereby incorporated by reference.

BACKGROUND OF THE INVENTION

Field of Invention

The present art relates to an online e-commerce and networking system with user joint online purchasing, joint wish fulfillment, user dynamic interaction, and user participatory online advertisements that effectively stimulates more e-commerce activities, adds additional values to users and enables advertisers to better monetize the online communities.

Description of Related Art

As reported by the news media, current social networking sites are successful in attracting users to use their social networking services to share information with others, but do not effectively monetize their online communities. Current social networking sites have little or no profit since their inception more than five years ago. These websites generate revenues largely from online advertisements, which receive poor response rates from their users. Only four in 10,000 people click on advertisements on social networking sites, compared with 20 in 10,000 across the web.

The reasons for the low click through rate for social networking sites are that: 1) users are interested in socializing with friends on these sites and they ignore online advertisements; 2) social networking sites do not know how to effectively connect online advertising to users' personal interests; 3) social networking sites attempt to predict users' interests by matching online advertisements to user contributed social contents without knowing what advertisements attract users; and 4) users have no say in the online advertising process and are not interested to click on online advertisements.

In addition, current social networking sites enable users' to build relationships only at a surface level by enabling them to share information with others. There are many dimensions for users to build better relationships with others in the real world. However, such factors have not been translated into the online virtual world. Current social networking sites do not help users foster deeper relationships among one another through an online platform system to allow users to help each other for their wide variety of needs.

E-commerce sites, such as eBay and Amazon have much lower reach rates and user memberships than major social networking sites; however, they generate much more revenue than current social networking sites because they directly sell products to consumers online. Users normally visit e-commerce sites when they need to buy something online and not for their social needs; therefore, e-commerce sites are lacking user contributed contents that are related to users' personal lives, such as sharing information, thoughts, photos and videos with others like they can do on social networking sites. This is the key reason why e-commerce sites can't generate the kind of traffic seen on social networking sites.

There is a huge gap between the two types of Internet businesses, which represents a tremendous potential for the future growth of the Internet. If a bridge can be built to seamlessly link social networking sites to e-commerce sites, a win-win situation for end-users and organizations would be realized. There is a need to invent new methods to effectively link social network functions to e-commerce functions.

In addition, although major search engine websites are able to generate huge online traffic and revenue, their online advertising module lacks user interaction, and therefore, they are unable to reach their fullest potential in getting more advertising dollars as evidenced by their low user response rates. There is a need to invent new methods to transform search engine advertisements into user interactive advertisements and to incorporate user-participated online advertisements into search engine websites.

Current online advertisements on the Internet are still at the 1.0 stage whereby advertisements are displayed to end-users in a passive way that are waiting for users to click on them and pop-up advertisements are ignored and un-welcomed by users. Even though Internet companies are trying to target their advertisements to users by matching advertisements to the contents users typed in, they do not really know what user wants and have not thought of methods to link online advertisements to users' personal lives and to make online advertising process user interactive. In other words, current online advertisements have not evolved from their 1.0 display status to 2.0 user interactive online advertisements.

There is a need to invent new methods to transform the current online advertisements into dynamic, user-participated and user controlled online advertisements. Instead of guessing and trying to match advertisements that may interest users, let users tell advertiser what advertisements they want and empower them to play a significant role in the online advertising process.

SUMMARY OF THE INVENTION

Brief Summary

The purposes of the invention are to: 1) effectively link social networking and e-commerce through entity and individual sponsorship to enable users to help and support each other's wide variety of needs; 2) significantly increase e-commerce activities through user joint purchasing, gifting, sharing, multi-dimensional and dynamic interactions; and 3) dramatically improve online advertising results on different types of websites by transforming static and passive online advertisements into user-participated and proactive online advertisements.

The present invention contains additional methods and functions of the proposed e-commerce and networking website (e.g., called HotTerrain.com) that we submitted our patent application for on May 21, 2008 (please refer to our U.S. patent application Ser. No. 12/154,241, published as U.S. Pub. No. 20090292595, the contents of which are incorporated by reference herein in their entirety). We had disclosed additional methods and functions to Syracuse Technology Garden, Seed Capital Funds of Central New York, Excell Partners, Inc., Mohawk Valley Edge, and several other entities and individuals since July 2008.

One embodiment of the present invention regarding the online e-commerce and networking system includes but is not limited to enabling users to help each other via entity and individual sponsorship, joint purchasing and joint wish fulfillment whereby users pool their resources and incentives obtained from advertisers and individuals to help and support one another. Users can request sponsorship from advertisers, friends, family and community members to: 1) obtain digital items (e.g., e-stamps, e-stickers, e-items, etc.) and real merchandise for themselves and for others at lower prices or for free; 2) obtain digital money for later usage; 3) play certain fee-based online games, join fee-based online events and learning sessions, etc. at a lower price or for free; 4) donate or raise funds for charities; 5) donate or receive digital money, digital or real items to or from others; 6) singly or jointly obtain digital and/or real items for family members, friends and acquaintances on occasions such as birthday, graduation, marriage, baby shower, etc.; 7) exchange digital and/or real items with others; and 8) arrange digital and physical assets for friends, family and others, etc.

The present invention provides: 1) more dynamic interactions among community members to enable them to support and help each other; 2) more options for users to set up committees for their communities and to establish community funds; 3) enabling users to effectively manage their multiple external website accounts; 4) enabling online influencers to enhance their status and influence; and 5) enabling employees of an organization to obtain digital and/or real items for co-workers on occasions such as promotion, birthday, marriage, farewell, etc.

For organizations, the present invention enables them to: 1) significantly increase sales and online traffic; 2) build direct and better relationships with users; 3) more effectively collect donations from users; 4) reach out to more users; and 5) improve operational effectiveness.

Advertisement Methods

Another embodiment of the present invention is related to online advertisements whereby not only do users control online advertisements displayed on their webpages and share in the advertising revenue, but also participate in the design and modification of online advertisements.

The present invention enables users to control advertisements on their HotTerrain (HT) webpages and community webpages and they control who can see their profiles, wish lists, and personal information. Users can request or select specific online advertisements of their interests to be displayed in their webpages, share in the advertising revenue, customize online advertisements and participate in the design process of online advertisements.

Advertisers who advertise on HotTerrain.com benefit tremendously from the present invention as they receive significantly improved online advertising results because of the follows reasons: 1) increased click through rates when users click on SponsorAds to request sponsorship and endorse advertisements; 2) supply targeted SponsorAds to users' HT spaces and communities based on more dynamic and quality data provided by users that lead to increased conversion rates and successful sales; 3) a user's participation in the online advertising process adds a human/personal element to SponsorAds whereby they are more likely to be clicked by the user's friends, family members and community members; and 4) increased display opportunities in multiple locations of HotTerrain.com as well as on external partnering websites.

The present invention enables advertisers to: 1) build one-to-one relationship with a user by online events and by sponsoring the user's needs and wishes, who would most likely have a good impression on the sponsoring advertisers and favor their products and services; 2) tailor product and service promotions that match users' online behavior so as to receive significantly improved response rates; and 3) enhance brand name recognition and turn ordinary users into advertising publishers through sponsorship.

The unique features and functions provided by the present invention to advertisers include but are not limited to: 1) create SponsorAds to promote products and services and set advertisement bidding prices (e.g., Cost Per Click, Cost Per Thousand Impression, etc.) and set user minimum HT score for sponsorship to control advertising expenses; 2) offer digital money (e.g., HT Money) to users who have high HT scores in exchange for displaying SponsorAds on their webpages; 3) sponsor qualified users and online communities to help them obtain digital or real items of their great interests and to play fee-based games, join fee-based online events and learning sessions, etc.; 4) set the total amount of Sponsorship for a SponsorAd to further control advertising expense; 5) renew a SponsorAd when its incentives are running out; 6) provide promotional virtual mails with collector e-stamps to users to achieve significantly improved opening rate; 7) incorporate HT Money, digital and/or real items as user incentives to promote sales; 8) team up with other companies to cross-promote products and services on HotTerrain.com; and 9) target user segments that are most likely to respond to their online advertisements, etc.

The present invention also provides methods to transform existing online advertisements into user incentive-based online advertisements to create a win-win situation for advertisers, advertising publishers and end-users. Companies and organizations not only have an option to display SponsorAds on their own websites, but also an option to integrate the present invention methods, features and functions into their own websites to share in the advertising revenue, to crease traffic and foster relationships with users.

For example, search engine companies can bridge the gap between their passive/static online advertisements and the users' personal interests, needs and preferences through displaying our SponsorAds and transforming their advertisements into user incentive-based advertisements. They will be able to: 1) build direct relationships with end users; 2) sponsor users' wide variety of needs to enhance brand name recognition; 3) increase search traffic by providing incentives that meet users' specific and wide variety of needs; 4) link search engine websites to users' personal lives; and 5) significantly increase online advertising results.

BRIEF DESCRIPTION OF THE DRAWINGS

FIG. 1 is an exemplary illustration of a user requesting sponsorship from individual(s) on the consumer-to-consumer marketplace of the e-commerce and networking system.

FIG. 8 is an exemplary illustration of an advertiser setting up a SponsorAd.

FIG. 9 is an exemplary illustration of inserting user incentives into third party online advertisements displayed on HotTerrain.com.

FIG. 17 is an exemplary illustration of group and role-based security.

FIG. 18 is an exemplary illustration of joint payment methods.

FIG. 19 is an exemplary illustration of free assets in the e-commerce and networking system.

DETAILED DESCRIPTION OF THE INVENTION

Figure 2:
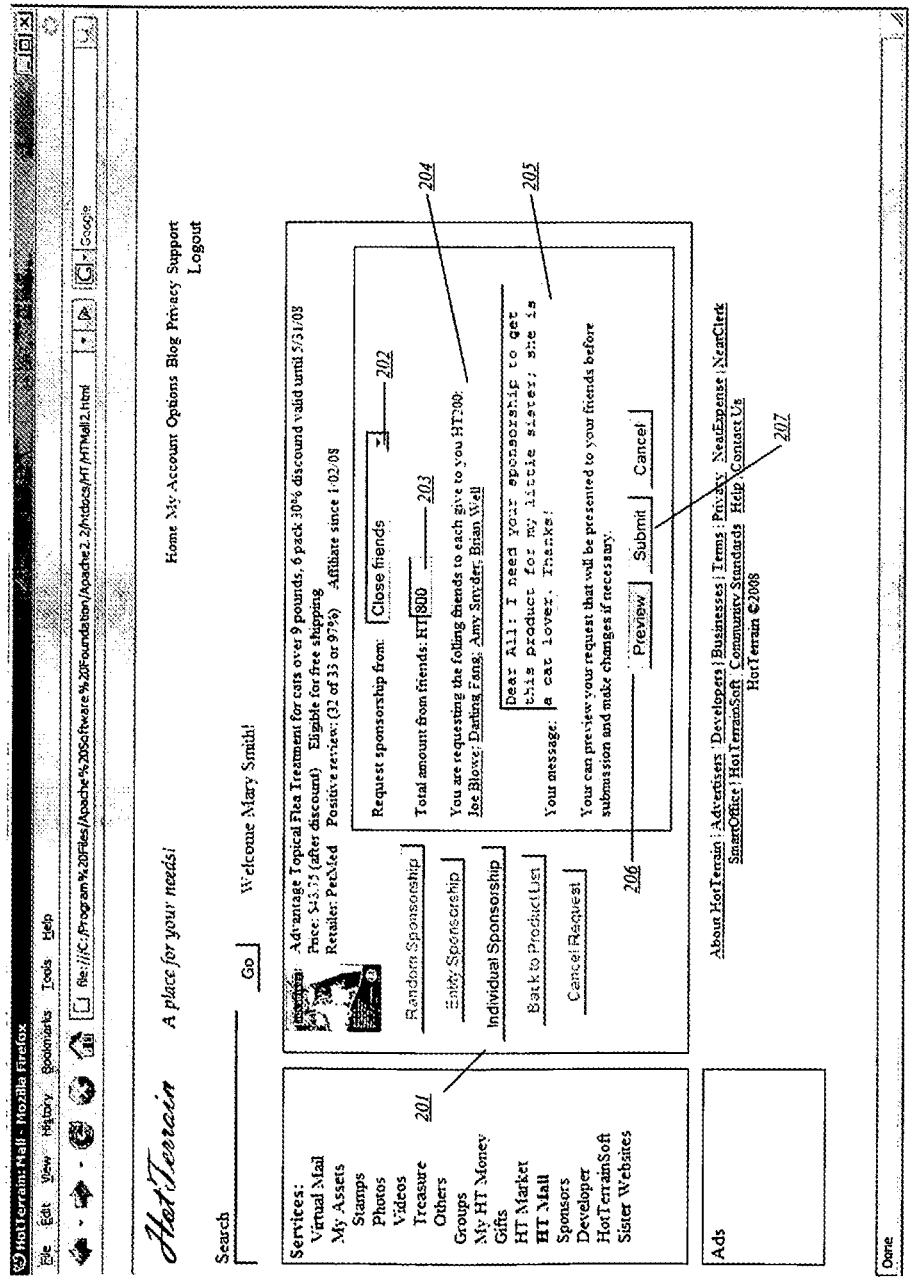
FIG. 2 is an exemplary illustration of a user requesting sponsorship from individual(s) on the business-to-consumer marketplace of the e-commerce and networking system.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention.

Parts of the description will be presented in terms of operations performed by a processor based device, using terms such as data, tables, requesting, selecting, supplementing, displaying, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor includes microprocessors, micro-controllers, digital signal processors, and the like, that are standalone, adjunct or embedded.

Various operations will be described as multiple discrete steps in turn, in a manner that is most helpful in understanding the present invention; however, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Other features of the illustrated embodiments will be apparent to the reader from the foregoing and the appended claims, and as the detailed description and discussion in conjunction with the accompanying drawings.

While the invention is described and illustrated here in the context of a limited number of embodiments, the invention may be embodied in many forms without departing from the spirit of the essential characteristics of the invention. The illustrated and described embodiments, including what is described in the abstract of the disclosure document, are therefore to be considered in all respects as illustrative and not restrictive. The scope of the invention is indicated by the appended claims rather than by the forgoing description, and all changes, which come within the meaning and range of equivalency of the claims are intended to be embraced therein.

Figure 1:
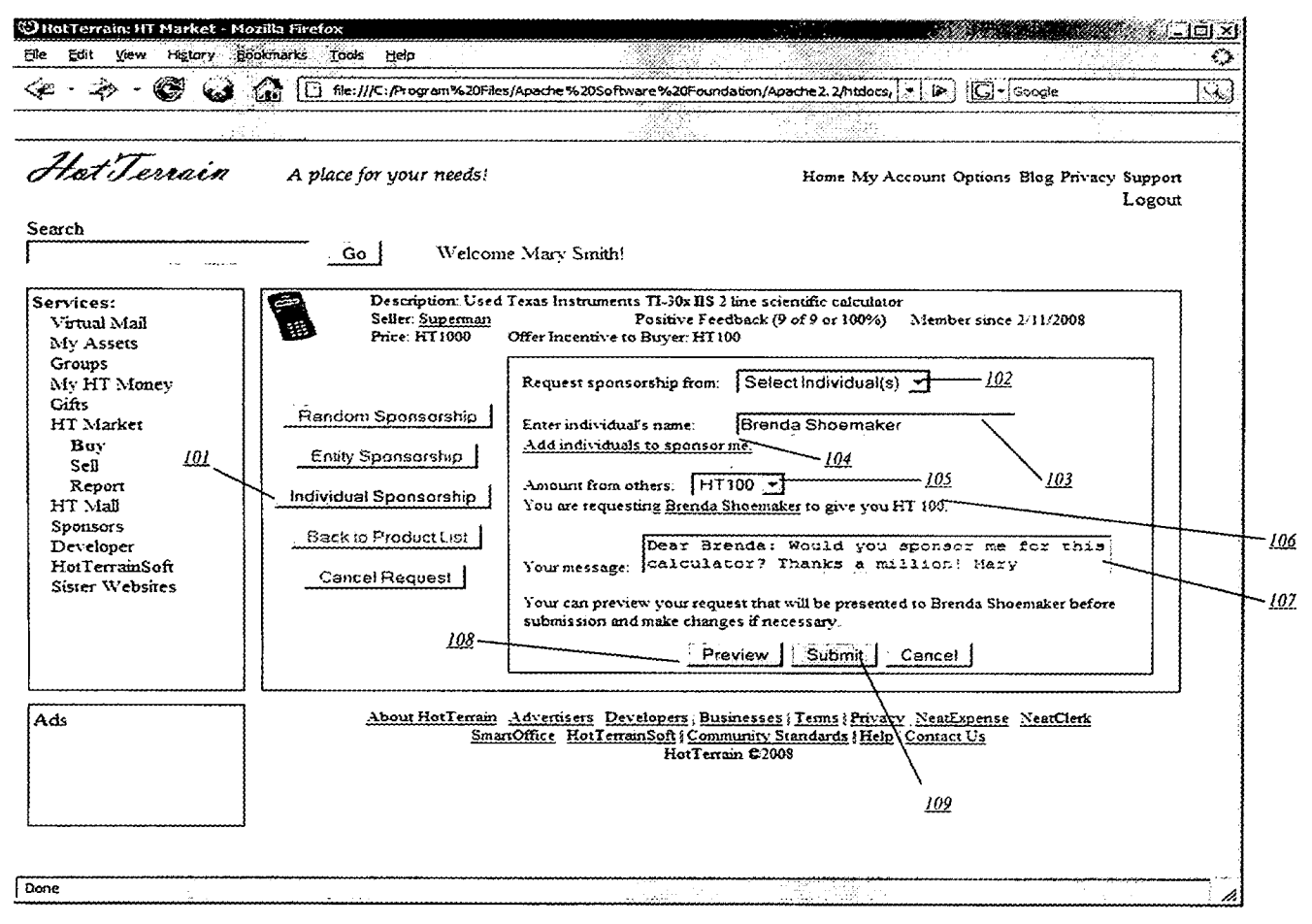

Now referring to the drawings and in particular to FIG. 1 that depicts a user (e.g., Mary Smith) requesting sponsorship from individual(s) on the consumer-to-consumer marketplace (e.g., HT Market) of the e-commerce and networking system. As indicated, user Mary Smith is interested in a used Texas Instruments calculator and intends to buy this item by requesting individual sponsorship to lower the price of the item. In this particular example, Mary clicks on "Individual Sponsorship" button 101 and the system allows her to select individual(s) or groups that she wants sponsorship from by clicking on the drop down menu 102 to select individual(s) or groups. She also has options of typing in the individual's name as shown at 103 and selecting multiple individuals by clicking the link 104. She can input or select the amount she wants from each individual by clicking on the drop down menu 105 or leave the amount blank to let the recipient(s) voluntarily provides any amount. Once she inputs or selects individual(s), a message similar to what's shown at 106 is automatically generated by the system to display her sponsorship request. The system also enables her to input a message 107 and preview her sponsorship request that will be presented to her recipient(s) by pressing "Preview" button 108. She can edit her sponsorship request until satisfaction and then press "Submit" button 109 to send out her sponsorship request. She has an option of setting a response deadline (not shown on FIG. 1) for her recipient(s) to respond.

Her recipient(s) can approve, reject or do nothing to the request. If her recipient(s) approves, an approval message is sent to Mary for her to proceed to the checkout process, the amount of sponsorship Mary requests will either be reserved in her recipient(s)' digital money account or Mary's digital money account if it's transferred from the recipient(s)' account to Mary's account until Mary completes the purchasing process. Once Mary purchases the item, the amount of sponsorship Mary requests will be deducted/released from the recipient(s) account or Mary's account and be deposited into the seller's account. In some cases, a user's received sponsoring amount from sponsors may be greater than the price of the item on sale. The system automatically sends the right amount to the seller and deposits the excess amount to the user's digital money account upon purchasing. The payment method can also be in other forms, such as credit card, PayPal, online checks, etc. User Mary Smith also has an option of canceling her sponsorship request before her recipient(s) responses her sponsorship request. A cancellation message is sent to each recipient immediately when Mary cancels the request. HotTerrain.com enables Mary to select other recipient(s) to sponsor her after sending her sponsorship request to her recipient(s) or after receiving a rejection from one of her prior batch recipient(s).

Referring to FIG. 2, therein is presented an exemplary user interface of the e-commerce and networking system that enables a user to request individual sponsorship on the system's business-to-consumer marketplace (e.g., HT Mall) according to the present invention. As represented in FIG. 2, user Mary Smith is interested in a flea treatment product for cats. In this particular example, Mary clicks on "Individual Sponsorship" button 201 and the system allows her to select individual(s) or groups that she wants sponsorship from by clicking on the drop down menu 202 to select individual(s) or groups.

In this case, she selects her "Close Friends" group (the group and role-based security functions will be further elaborated in FIG. 17). She also has options of typing in the individual's name and selecting multiple individuals by clicking the links similar to 103 and 104 of FIG. 1 (not shown on FIG. 2). As indicated on FIG. 2, Mary can input or select the amount she wants from all individuals by inputting the amount shown at 203, by clicking on the drop down menu to select (not shown), or leave the amount blank to let recipient(s) voluntarily provides any amount. Once she inputs or selects the total sponsorship amount she wants, the system automatically calculates the amount each individual will provide her and displays a message similar to what's shown at 204. The system also enables her to input a message 205 and preview her sponsorship request that will be presented to her recipient(s) by pressing "Preview" button 206. She can edit her sponsorship request until satisfaction and then press "Submit" button 207 to send out her sponsorship request. She has an option of setting a response deadline (not shown on FIG. 2) for her recipient(s) to respond.

Her recipient(s) can approve, reject or do nothing to the request. If her recipient(s) approves, an approval message is sent to Mary for her to proceed to the checkout process, the amount of sponsorship Mary requests will either be reserved in her recipient(s)' digital money account or Mary's digital money account if it's transferred from the recipient(s)' account to Mary's account until Mary completes the purchasing process. Once Mary purchases the item, the amount of sponsorship Mary requests will be deducted/released from the recipient(s) account or Mary's account and be deposited into the seller's account.

In one embodiment of the present invention, if multiple recipients approve Mary's request for sponsorship at different times, the system may reserve the sponsoring amount in early approvers' digital money accounts, show Mary the reduced balance upon each recipient's approval, and actually perform the digital money transfer when Mary finally purchases the item. Edit checks are built in to ensure that digital money accounts of all participants have sufficient amounts for any sponsorship or digital money transfer. If Mary does not complete the purchasing process by a deadline (e.g., a reasonable time period after the response date she set or when the item is no longer on sale due to other users' purchase or due to seller's withdrawal), the system has options to unfreeze the sponsoring amount from Mary's recipient(s)' digital money account(s) and inform Mary that she has not purchased the item by the deadline or the item is no longer on sale and the digital money she requested from her recipient(s) is unfrozen and returned to her recipient(s). She can request her recipients to donate digital money to her that is not tied to any item if she likes.

In some cases, a user's received sponsor amount may be greater than the price of the item on sale. The system automatically sends the right amount to the seller and deposits the excess amount to the user's digital money account. The payment method can also be in other forms, such as credit card, PayPal, online checks, etc. Such transactions are conducted in real money, and each transaction is performed preferably upon a recipient's approval (meaning, the sponsoring amount in real money terms is processed from the recipient's credit card, PayPal account or bank account when the recipient approves the request) and the seller gets the real money amounts from Mary's sponsors, although the seller may need to pay transaction fees associated with credit card, PayPal or online check processing. If Mary receives rejections from some of her recipients, she can send her request to additional people, such as her other friends, family members and community members.

The seller has options to ship the item until full payment is received or when the payment reaches certain amount to allow the remaining balance to be paid after the item is shipped. If Mary does not complete the purchasing process by a certain deadline and the product has not been shipped, the system activates functions to refund the exact payments made by the payers or impose penalty fees and return the remaining payments to the payers. If Mary defaults on her payment for the remaining balance after the product is shipped, the seller can report her default activity to Credit Bureaus. Also, the option for Mary to cancel her sponsorship request is similar to that of FIG. 1.

Figure 3:
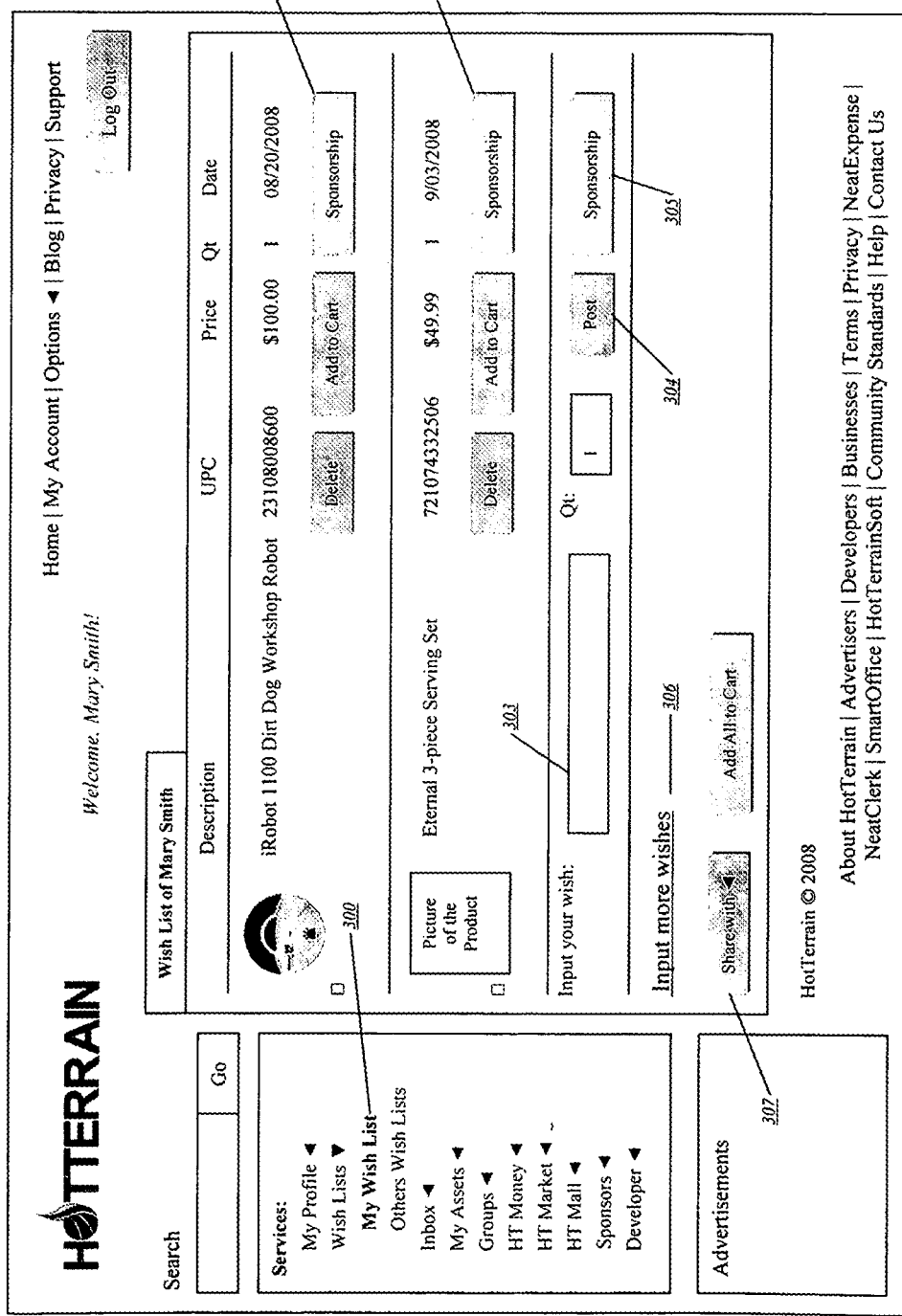
FIG. 3 is an exemplary illustration of a user's wish list on the e-commerce and networking system.

Now referring to FIG. 3, therein is depicted an exemplary illustration of a user's wish list page. Let's assume user Mary Smith added "iRobot 1100 Dirt Dog Workshop Robot" from HT Mall and "Eternal 3-piece Serving Set" from HT Market to her wish list by clicking on "Add to Wish List" button next to the item on HT Mall and HT Market, similar to existing e-commerce websites that allow a user to add item(s) to a shopping cart or wish list. When Mary clicks "My Wish List" Link 300 on the left navigation menu, she is presented with a screen similar to FIG. 3. As one embodiment of the present invention, Mary can click on "Sponsorship" buttons 301 and 302 to request or solicit sponsorship from individuals and entities. The user can also input her wish in textbox 303 for items not found on HotTerrain or for obtaining digital money, and press "Post" button 304 to post her typed-in wish to her wish list, which is accessible by individuals she authorizes. Similarly, she can request or solicit sponsorship for her typed-in wish from individuals and entities by clicking on "Sponsorship" button 305. She can also click on "Input more wishes" link 306 to input her multiple wishes. Mary can also add items found on other e-commerce website into her HotTerrain wish list. Also, the system enables Mary to click on "Share with" button 307 to share her wish list with individuals or groups she likes, including publishing her wish list to the world.

Figure 4:
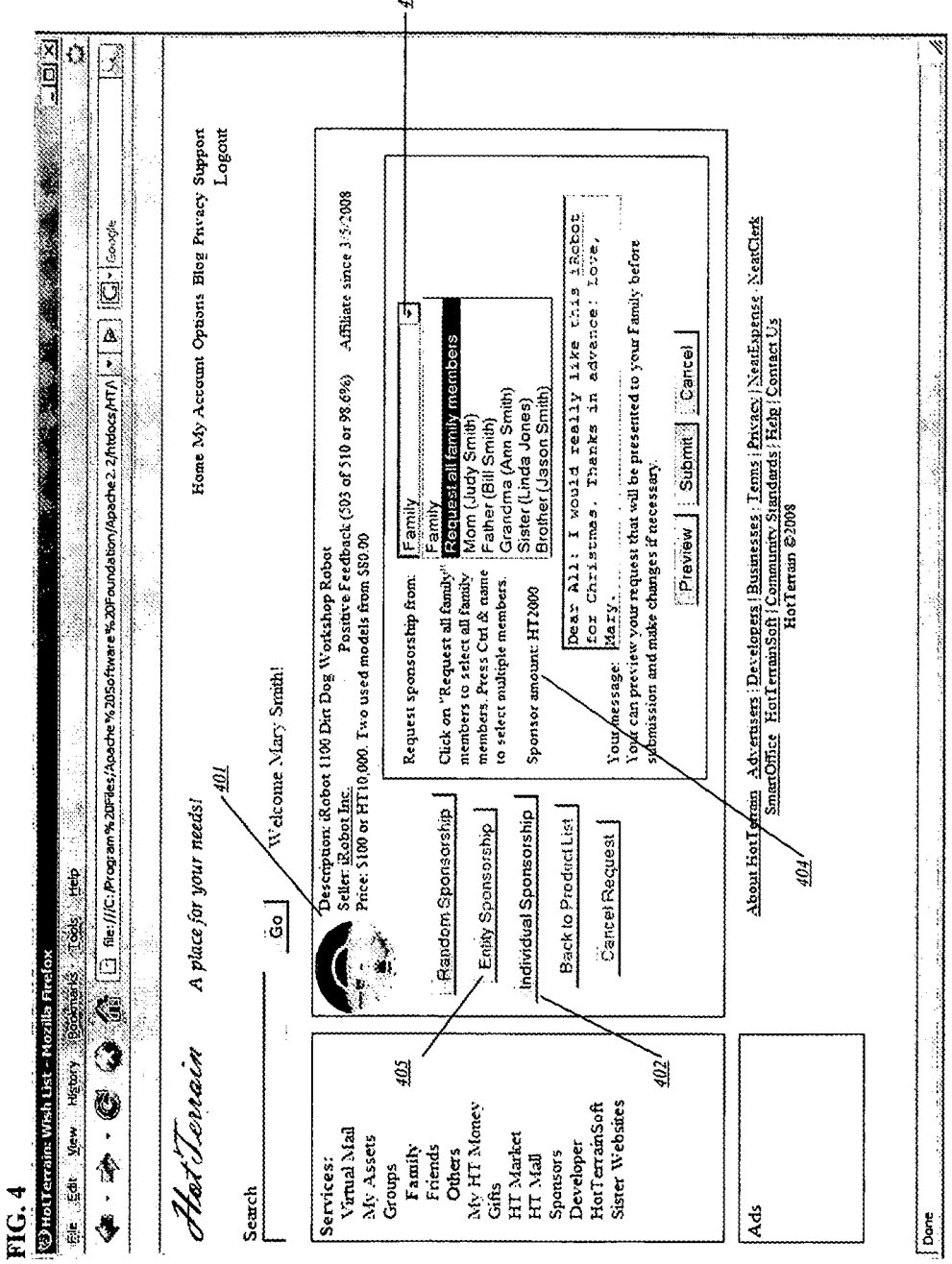
FIG. 4 is an exemplary illustration of a user requesting individual sponsorship for wish fulfillment.

With reference to FIG. 4, therein is depicted an exemplary illustration of a user (e.g., Mary Smith) requesting sponsorship from individuals to fulfill one of her wishes. As illustrated on FIG. 4, Mary Smith is interested to get an iRobot as her Christmas gift as shown at 401. Assuming the price of the iRobot is US$100 and the seller also accepts digital money (e.g., HT Money), the HotTerrain system automatically calculates equivalent HT Money based on an exchange rate between HT Money and US dollars (the system maintains and calculates current exchange rates between HT Money and real currencies, including non-US currencies). Mary decides to request sponsorship from individuals by clicking on "Individual Sponsorship" button 402. She then selects "Family" group from the dropdown menu 403 and further selects "Request all family members" to have five members listed in this group to sponsor her for the iRobot. HotTerrain system automatically calculates the sponsoring amount from each family member based on the price of the iRobot as shown at 404. Similarly, she has options to input a message, set a deadline, preview her request and modify her request before sending out her request for wish fulfillment. The transaction process after sending out her request is similar to that of FIG. 1 or FIG. 2.

Figure 5:
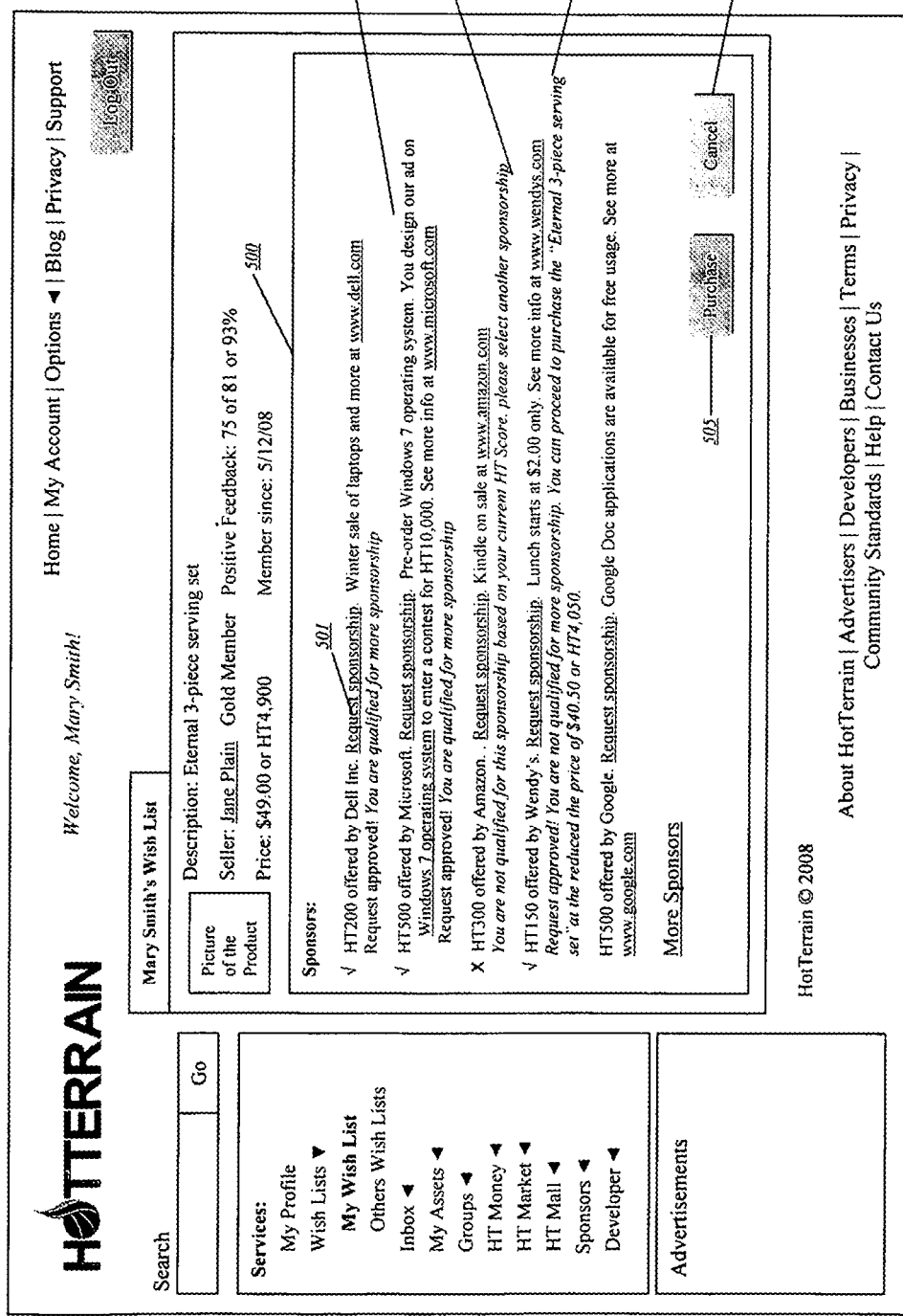
FIG. 5 is an exemplary illustration of a user requesting advertisers to fulfill a wish.

Referring to FIG. 5, therein is depicted an exemplary illustration of a user (e.g., Mary Smith) requesting advertisers to fulfill a wish. As depicted, user Mary Smith is interested to purchase "Eternal 3-piece serving set" from seller Jane Plain. She presses "Sponsorship" button 302 of FIG. 3, chooses "Entity Sponsorship" (this step is skipped, however, it's similar to pressing "Entity Sponsorship" button 405 on FIG. 4) and is presented with sponsor list 500. For simplicity, only five SponsorAds are displayed on Sponsor List 500 and the user can click on any "Request sponsorship" link to request sponsorship from advertisers. For example, Mary clicks on "Request sponsorship" link 501, a pop-up window or expansible area of the same sponsor list page shows the detailed content of Dell Inc.'s advertisement, Mary's current HT Score, Dell Inc.'s minimum HT Score requirement for this particular sponsorship, a message saying "you are qualified for this sponsorship" (assuming Mary's HT score meets Dell Inc.'s requirement) and an "Accept" button for Mary to obtain HT200 from Dell Inc. (not shown on FIG. 5). Once pressed, a message such as "Request approved. You are qualified for more sponsorship. This SponsorAd will be placed in your HT Space and Community web pages for 30 days" appears on the screen. Mary has an option to proceed to obtain sponsorship by clicking on "Request sponsorship" links 502, 503 and 504 until she no longer qualifies for more sponsorship. If a SponsorAd accepted by Mary is clicked by other users on her HotTerrain Webpages, Mary may obtain an additional amount of digital money from the advertiser for each click (e.g., HT 1 per click).

As shown on FIG. 5, Mary is not qualified for Amazon's sponsorship when she clicks on "Request sponsorship" at 503, but the system informed her to select another Sponsorship. Each time she obtains HT Money from the sponsoring company, the amount of digital money sponsorship is deducted from the price of the product she is interested in. For this particular example, she obtains a total of HT850, which is deducted from HT4,900 of the price of the item. In other words, the seller gets HT850 from Mary's sponsors if Mary purchases the serving set at a lowed priced of $40.50 or HT4,050 by pressing "Purchase" button 505. If she presses "Cancel" button 506 to abandon her purchasing, the amount of sponsorship she obtains is deposited into her HT Money account and subtracted from the sponsors' HT Money accounts and the Sponsoring entities' SponsorAds will be displayed on Mary's HotTerrain space and community webpages for a certain period of time (e.g., 30 days).

If the user decides to cancel an approved sponsorship before purchasing the item, the amount of incentive (e.g., HT200 from Dell Inc.) is taken back by HotTerrain and deposit back into Dell Inc.'s HT Money account, and Dell Inc.'s advertisement is removed from the user's HT space and community webpages, and the price of the item is adjusted back by adding HT200. The user can then select another sponsor for sponsorship or to abandon the requesting sponsorship or purchasing action. Similarly, in the case wherein the sponsoring amount from advertisers is greater than the value of the item, the user may receive the overage amount in her HT Money account when she completes the purchasing process.

Figure 6:
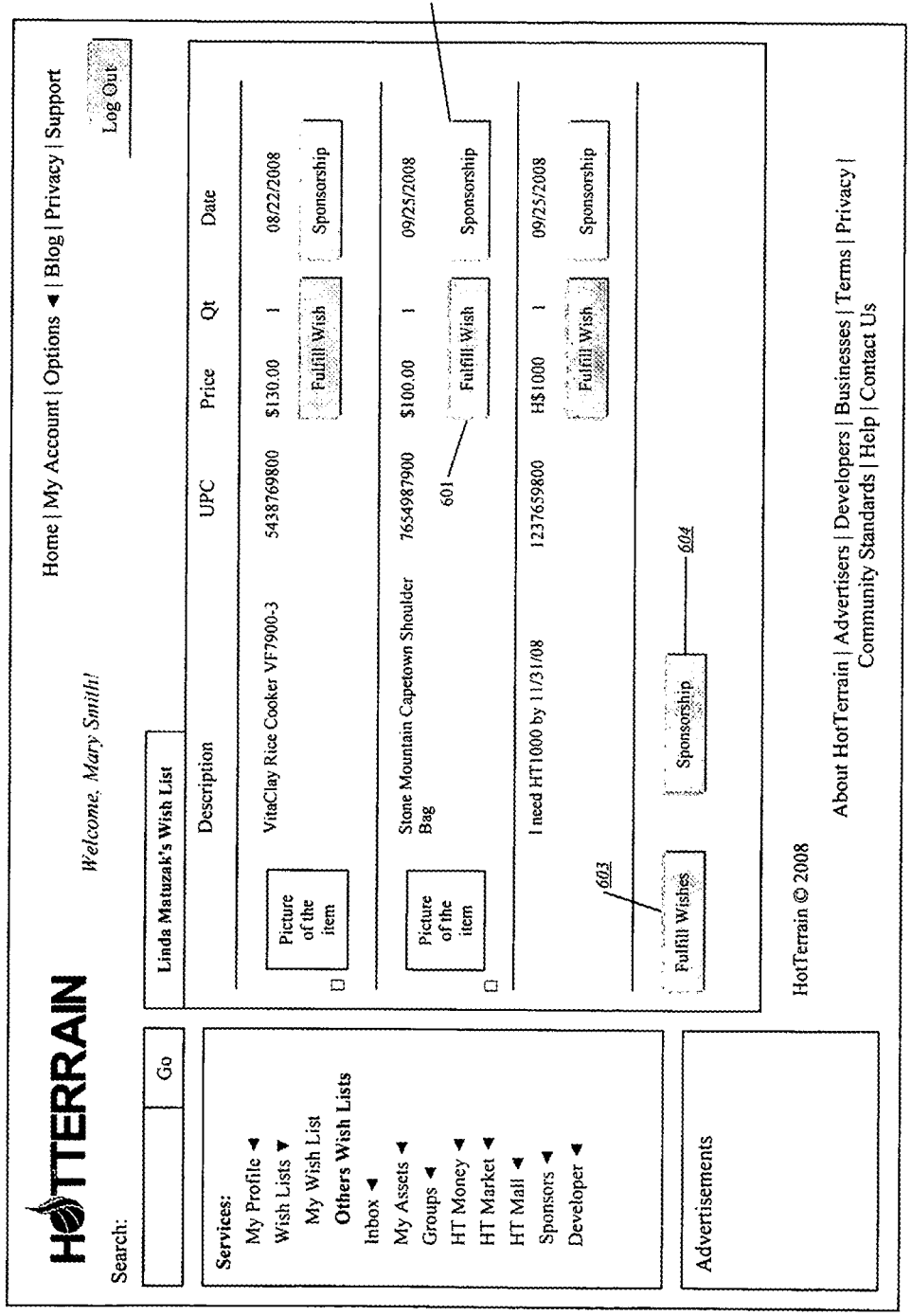
FIG. 6 is an exemplary illustration of a user accessing a friend's wish list.

Now, referring to FIG. 6, therein is presented an exemplary illustration of a user (e.g., Mary Smith) viewing a friend's wish list. As represented on FIG. 6, Mary Smith is authorized by her friend Linda Matuzak to view Linda's wish list, which includes VitaClay Rice Cooker, Ston Mountain Capetown Shoulder Bag and Linda's wish to obtain digital money HT 1,000. Mary Smith has options to click the "Fulfill Wish" button 601 of the item she intends to voluntarily fulfill for Linda or the "Sponsorship" button 602 to request advertisers to help her sponsor Linda's specific wish. The system also enables Mary to select Linda's multiple wishes (e.g., select checkboxes in front of items she wants to fulfill Linda's wishes) and press "Fulfill Wishes" button 603 to fulfill Linda's wishes by herself or with other individuals or press "Sponsorship" button 604 to request advertisers to help her fulfill Linda's multiple wishes.

Figure 7:
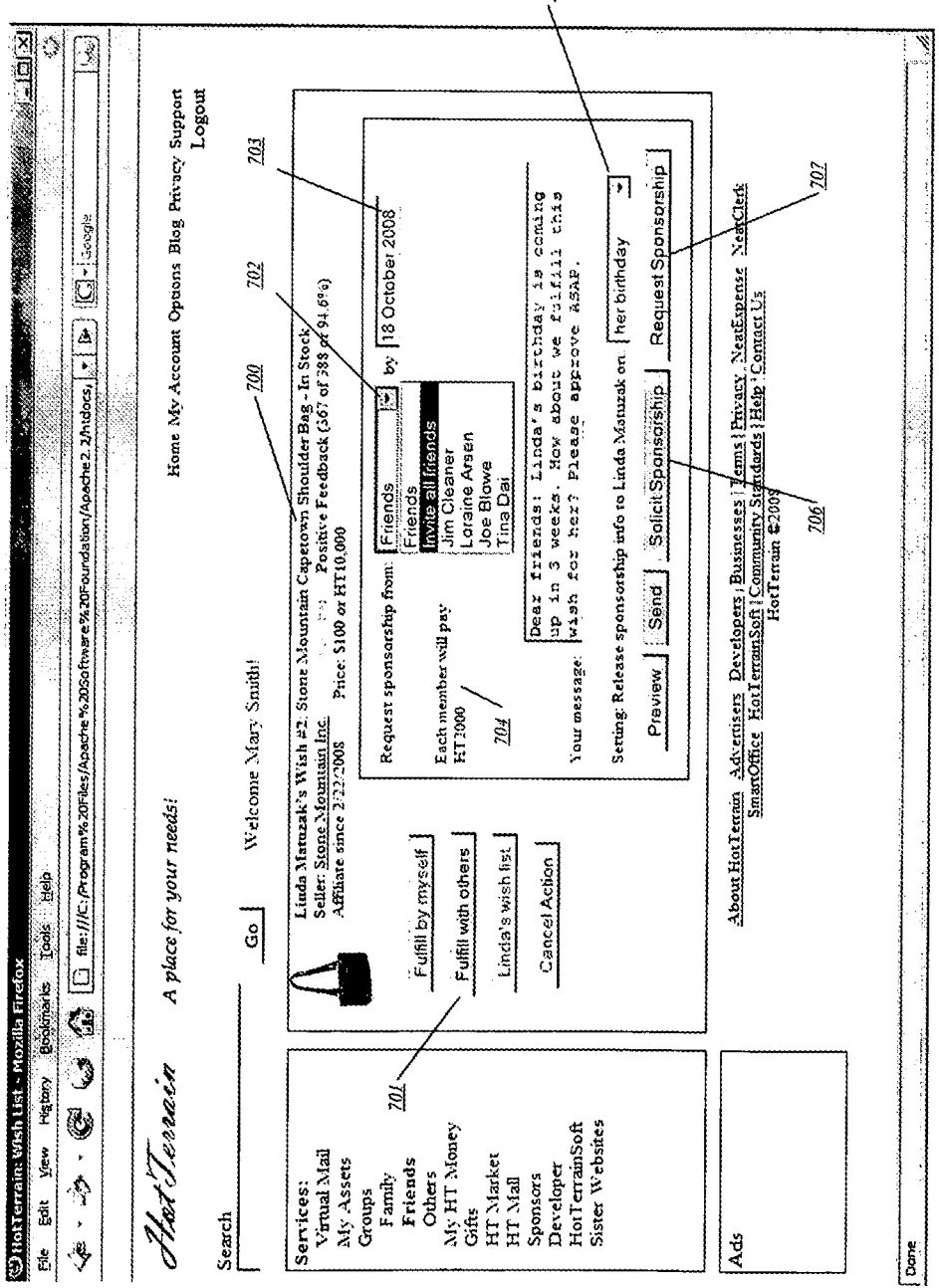
FIG. 7 is an exemplary illustration of a user voluntarily fulfilling a friend's wish with others.

Referring to FIG. 7 therein is presented an exemplary illustration of a user (e.g., Mary Smith) voluntarily fulfilling a friend's wish with other individuals. As indicated, Mary Smith chooses to fulfill her friend Linda Matuzak's second wish as shown on FIG. 6. By clicking on "Fulfill Wish" button 601 of FIG. 6, Mary is then presented with an exemplary screen display 700. She is presented with several options, such as to fulfill the friend's wish of a Stone Mountain shoulder bag by herself; to fulfill the friend's wish with others; to go back to Linda's wish list; or to cancel the fulfillment action.

In this exemplary scenario, Mary chooses to fulfill Linda's wish for a Stone Mountain shoulder bag with her friends. She selects "invite all friends" from the dropdown menu 702 and set a response date as shown at 703. The HotTerrain system automatically calculates each member's contribution amount (including Mary Smith's) for fulfilling Linda's wish as shown at 704. Similarly, Mary can input a message, preview her request and edit her request before sending her request to her friends. She can also set date of releasing this fulfillment information to Linda by clicking on drop down menu—705 to select a date from a calendar or input a date. In this exemplary scenario, Linda will receive information about her wish for a Stone Mountain bag is fulfilled by Mary Smith and her friends as well as the item delivery information on her birthday (Linda provided her birthday when she created her HotTerrain account). Before that set-date for information release, the HotTerrain system displays a generic message next to Linda's wish item such as "this item is in the process of being fulfilled by someone" to Linda and all her authorized individuals to view, so that duplicate fulfillment efforts can be avoided.

The system enables Mary's friends to request sponsorship from entities and other individuals to fulfill Linda's wish. Similarly, if some of Mary's friends rejected her request to fulfill Linda's wish or do not respond by the due date, Mary can request other individuals in her network by selecting from the dropdown menu 702, pressing "Solicit Sponsorship" button 706 to allow system automatic match of sponsoring advertisers to help her out, or pressing "Request Sponsorship" button 707 to request specific sponsoring advertisers to help her out. See details of advertiser sponsorship process on FIG. 5.

Figure 8:
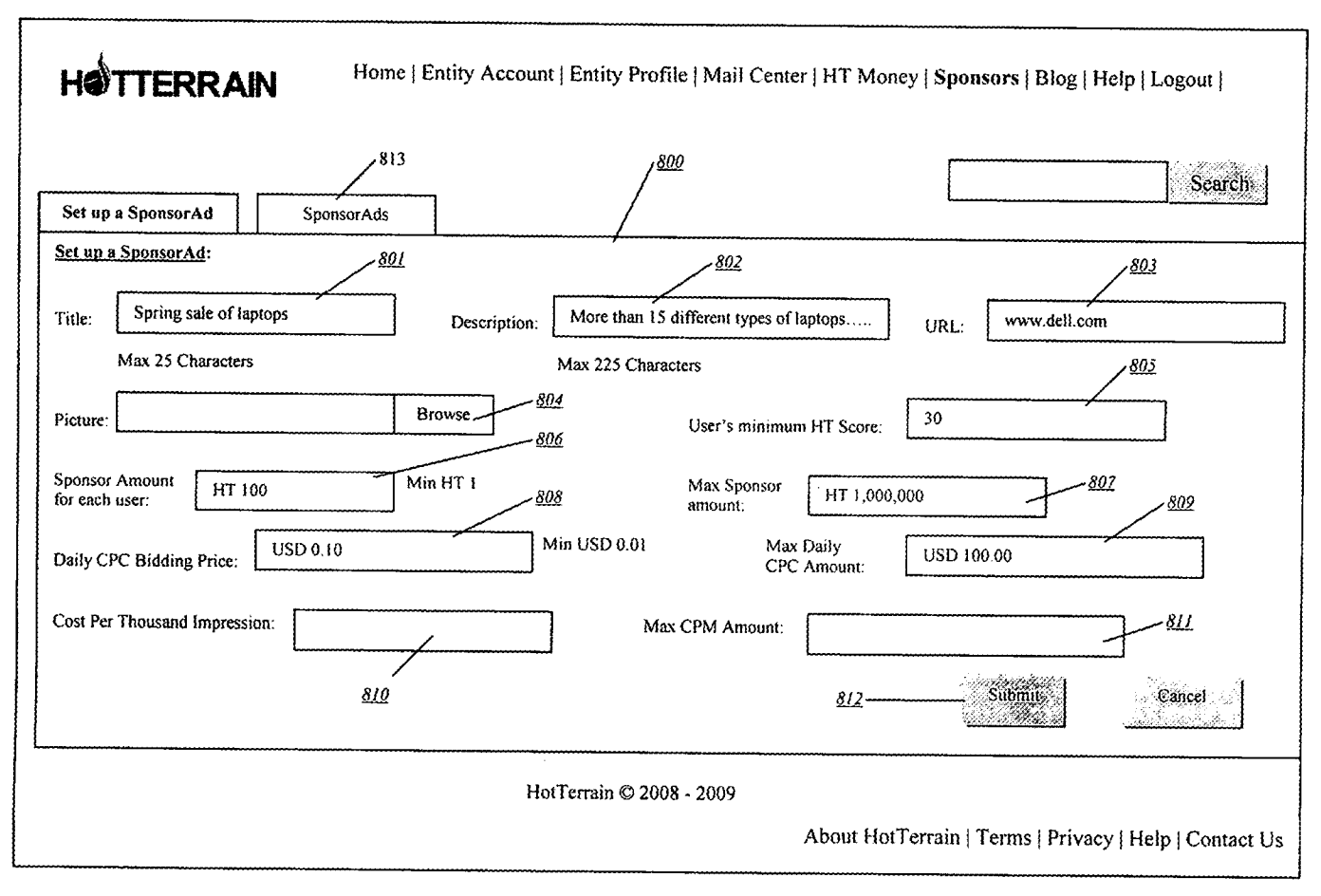

With reference to FIG. 8, therein is depicted an exemplary illustration of an advertiser setting up a SponsorAd (refer to our patent application Ser. No. 12/154,241). As indicated in display 800, an administrator of an entity that intends to advertise on HotTerrain can set up a SponsorAd by inputting information such as Title 801, Description 802 and URL 803. The administrator can also upload a picture of the product or service that will be advertised by clicking on "Browse" button 804. The administrator can then set a user's minimum HT score in textbox 805 for a user to obtain the incentive associated with the advertisement he is creating and also set the sponsor amount for each user at 806. HotTerrain may display Average User HT Score and suggest the minimum HT score to advertisers to facilitate their decision-making.

To control the total sponsor amount, the administrator can set maximum sponsor amount at 807 for the particular advertising campaign. The administrator can further control the advertisement cost by setting Daily Cost Per Click (CPC) at 808 and Maximum Daily CPC amount at 809, or Cost Per Thousand Impression (CPM) at 810 and Maximum Daily CPM amount at 811. Once completed, the administrator can click on "Submit" button 812 to post and activate the SponsorAd. Edit checks are in place to ensure that the advertiser's HT Money account has sufficient balance to cover the sponsoring cost. Multiple administrator IDs can be created for an advertising company to manage its SponsorAds on HotTerrain. The administrator(s) can click on "SponsorAds" tab 813 to view or edit all SponsorAds they created. HotTerrain may allow advertisers to borrow HT Money to sponsor users and pay back the borrowed amount with interest at a later time.

Now, referring to FIG. 9, therein is presented an exemplary illustration of a HotTerrain webpage that incorporates third party online advertisements. For this particular example, the Google AdSense program is integrated into HotTerrain.com as shown at 901. A message similar to 902 is displayed to inform user Mary Smith that she can obtain HotTerrain digital money by clicking on Google advertisements up to a daily maximum. The system automatically tracks each click of a Google advertisement from a user and deposits the corresponding amount of the digital money (e.g., HT1 per click) to the user's HT Money account until the daily maximum is met. The user can then use the digital money for her various needs. Therefore, the present invention effectively transforms existing static/passive online advertisements into user-participated online advertisements to achieve significantly improved online advertising results.

Figure 10:
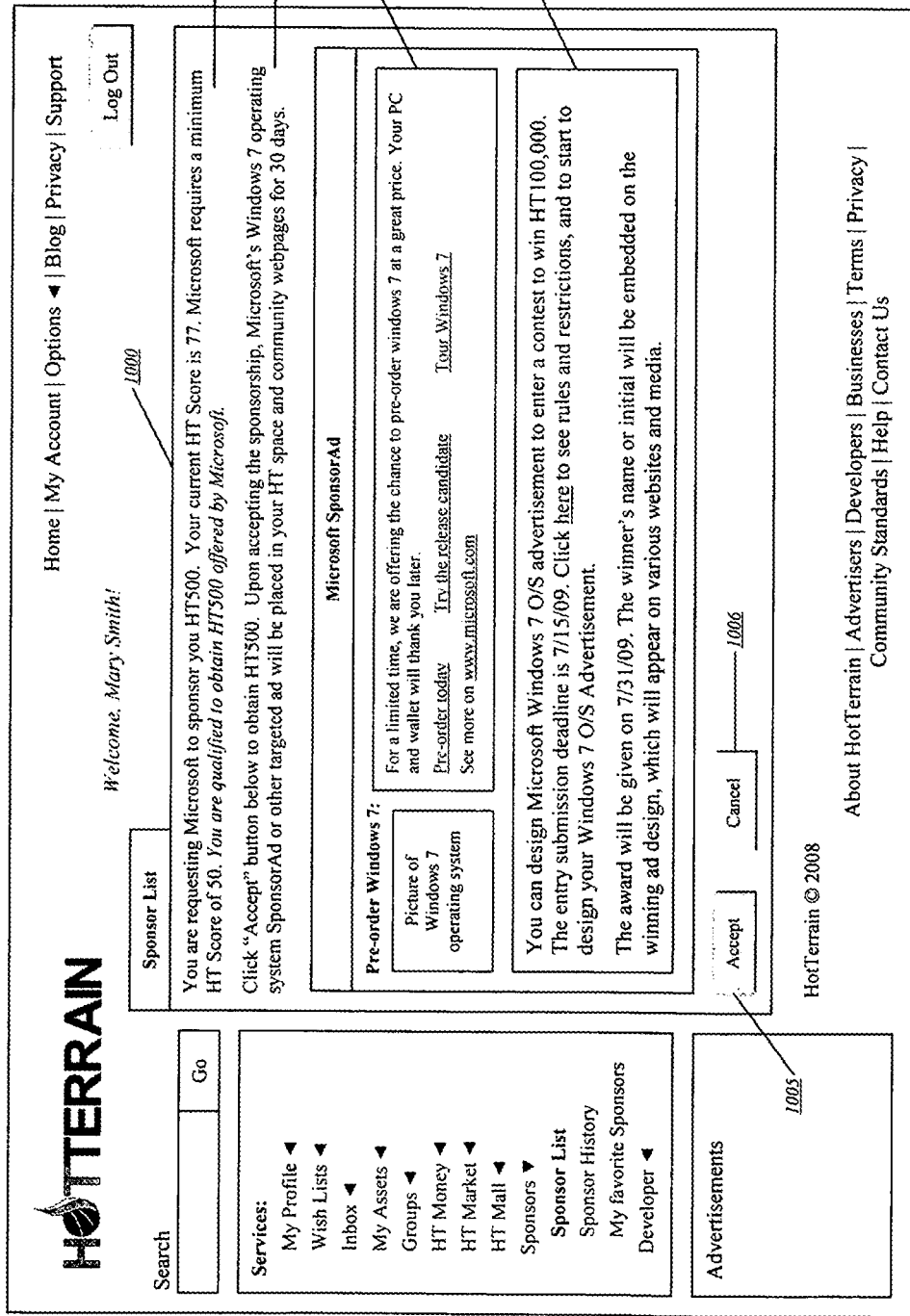
FIG. 10 is an exemplary illustration of user participation on online advertisement design.

Referring to FIG. 10, therein is presented an exemplary illustration depicting one embodiment of our invention to enable users to design advertisements for advertisers. The display 1000 showing a HotTerrain user interface is the result of clicking a SponsorAd similar to the second SponsorAd shown on FIG. 5. A SponsorAd can be displayed on multiple webpages of HotTerrain upon a user's various actions, such as when a user: 1) requests sponsorship from entities to fulfill wishes; 2) obtains certain unique items on Assets application or module; 3) participates in certain, events on Groups application or module; 4) obtains certain items on HT Market and HT Mall applications and modules; 5) obtains sponsorship on Sponsors module; and 6) obtain sponsorship on Developers applications or module, etc.

For this exemplary illustration, let's assume user Mary Smith clicks on "Request sponsorship" link 502 on FIG. 5 and she is presented with display 1000 to proceed with the process of obtaining sponsorship from Microsoft. As depicted, the system displays her current HT score, Microsoft's minimum HT score for obtaining the particular sponsorship and her qualification for the sponsorship at 1001. The system instructs her to click "Accept" button 1005 at the bottom of the page and informs her of the result of such acceptance at 1002. The page displays Microsoft's SponsorAd regarding its Windows 7 Operating System that comprises "Pre-order Windows 7" 1003 and "Windows 7 0/5 Advertisement Contest" 1004. The exemplary advertisement 1003 comprises title, picture, advertisement content, links and video. The "Windows 7 0/5 Advertisement Contest" announcement 1004 enables the user to design "Windows 7 0/S Advertisement" to win the award (e.g., HT Money, real money or other compensations). By clicking the link in 1004, the user can proceed to design the advertisement for Microsoft who sets specific rules, restrictions and requirements for the particular advertisement design.

This type of interactive advertisement helps foster a better relationship between an organization and an end-user or consumer. Those skilled in the art will appreciate that a SponsorAd may only comprise advertisement area similar to that of 1003, only comprise invitation for user advertisement design similar to 1004 or both as shown on FIG. 10. In some cases, a user does not need to participate in the advertisement contest the first time she sees the announcement, rather she can accept the SponsorAd to obtain the incentive and then find this advertisement on her multiple webpages later on to participate in the contest, such as her sponsor history page, sponsor list, SponsorAd area of her various webpages, through SponsorAd search, etc. In some other cases, a user needs to complete the customization or modification of a particular advertisement in order to obtain the associated incentives, and such task is normally easier whereby the user simply customizes or modifies the advertisement to be displayed to add some personal characters or preferences, including font, size, color, audio, graphics, video, content and the like. This type of advertisements will be more attractive to the user's friends, family and community members because of user participation and personalization. Therefore, they lead to dramatically improved online advertising results.

For FIG. 10, when user Mary Smith clicks "Accept" button 1005, the system automatically deducts HT500 from Microsoft's HT Money account and deposits the amount into Mary's HT Money account (not shown), and Microsoft's advertisement is displayed in her HT space and community webpages for a certain period of time (e.g., 30 days). If Mary does not like the advertisement or for other reasons, she can abandon the request sponsorship process by clicking on "Cancel" button 1006 or by switching to another page.

Figure 11:
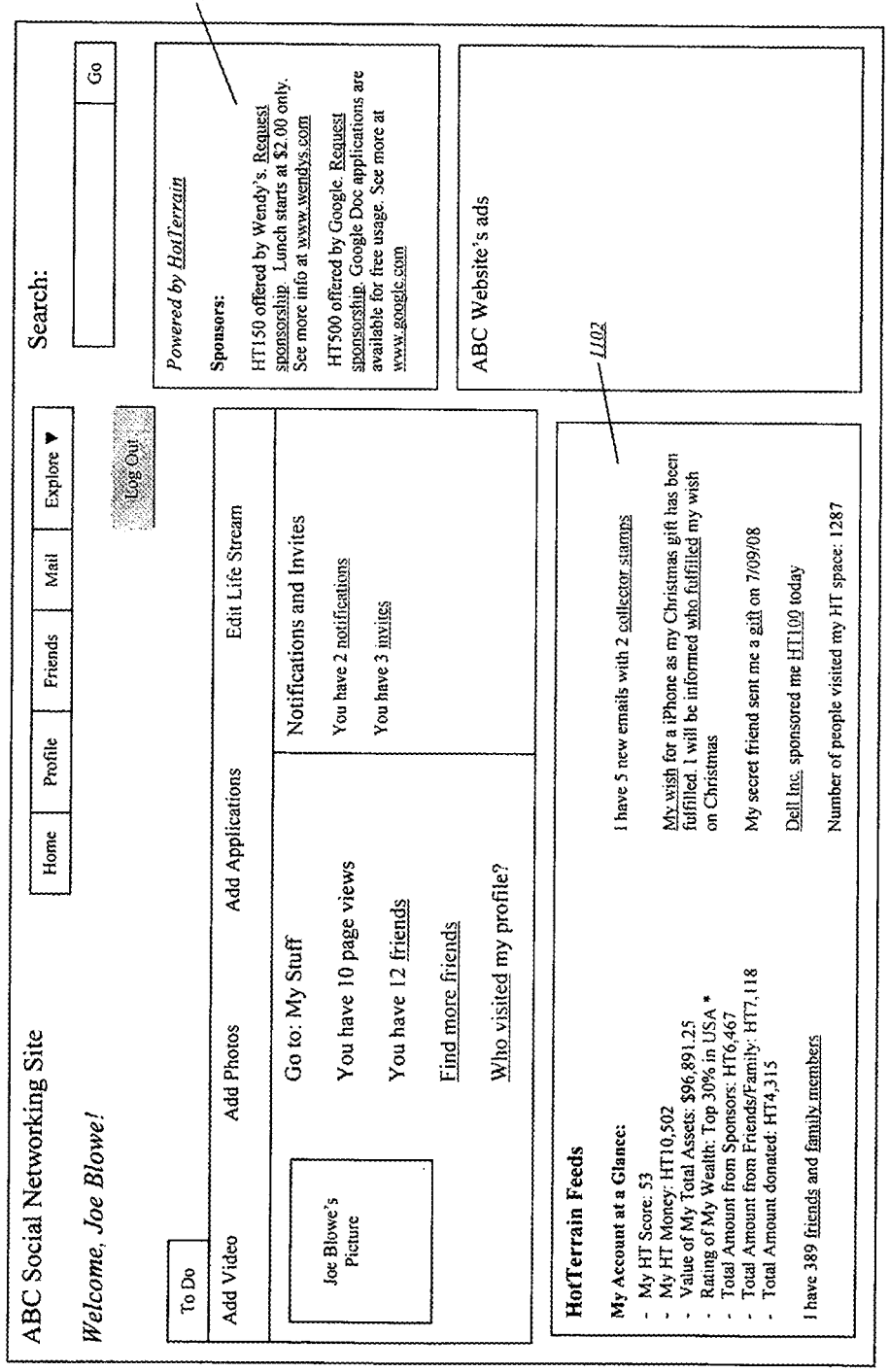
FIG. 11 is an exemplary illustration of allowing other websites to download scripts to integrate present invention functions.

Now, referring to FIG. 11, therein is presented an exemplary illustration depicting one embodiment of the present invention in implementing HotTerrain.com unique methods and functions to other third party websites that support user account creation. For this particular example, a social networking site (e.g., ABC Social Networking) incorporates HotTerrain scripts to become part of HotTerrain network that offers unique functions to its users. HotTerrain automatically identifies users having accounts on both HotTerrain and ABC social networking site by the following methods: 1) comparing email addresses provided by users to the two websites so that matching email accounts can be identified; 2) enable a user to type in his ABC social networking site login ID and password on his HotTerrain account to enable system interface to identify users with accounts on both websites; and 3) enable a user to type in his HotTerrain login ID and password on his ABC social networking site account to enable system interface to identify users with accounts on both websites.

As depicted on FIG. 11, the system identifies user Joe Blowe has accounts on both websites. When Joe Blowe logs on to ABC Social Networking site, he is then able to see HotTerrain SponsorAds 1101 that are supplied by HotTerrain and are targeted to him based on his online behavior on both ABC Social Networking site and HotTerrain. The user's advertising space and activities on ABC Social Networking site are included in the calculation of his HT Score, which increases his HT Score because he has more available advertising space and activities (see example of HT score calculation in patent application Ser. No. 12/154,241). In this particular example, when Joe Blowe clicks on "Request sponsorship" link of the first SponsorAd shown in 1101, he immediately accesses his HotTerrain account due to system interfacing or single sign-on and he is able to proceed to the sponsorship process. If he qualifies and accepts the sponsorship, the advertiser will immediately place targeted SponsorAds on his ABC Social Networking webpages and HotTerrain webpages through HotTerrain system. If Joe Blowe doesn't have a HotTerrain account, when he clicks on "Request sponsorship" link of the first SponsorAd shown in 1101, he is presented with the detailed content of the SponsorAd and a link to create a HotTerrain account.

In this particular example, since Joe Blowe is also a HotTerrain user, the HotTerrain system automatically supplies HotTerrain Feeds that contain his HotTerrain status updates into his ABC Social Networking site account, including but not limited to what is displayed in area 1102. The user is able to get updates of his HotTerrain account status and activities while using ABC Social Networking site. And he can click on the links shown on 1102 to immediately access the respective pages of his HotTerrain account to interact with HotTerrain without the need to sign in. The third party websites that can join HotTerrain network include all types of websites, such as Web 2.0 sites, e-commerce sites, email sites, hotel reward sites, airline sites, etc.

Figure 12:
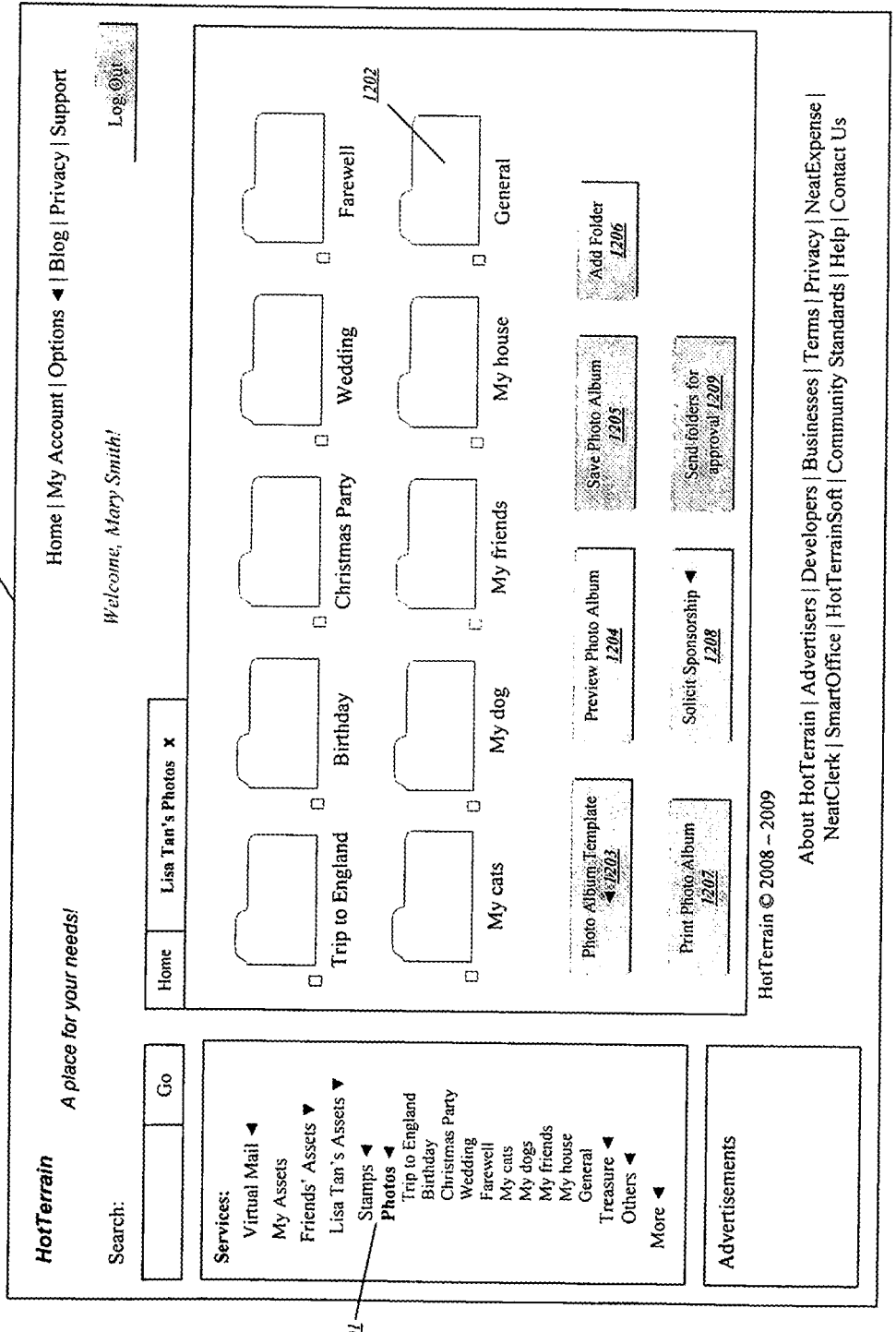
FIG. 12 is an exemplary illustration of unique functions to enable users to arrange other users' assets.

With reference to FIG. 12, therein is depicted an exemplary illustration of one embodiment of our invention to allow users to arrange other users' assets to enable more user interactions on HotTerrain.com. As indicated, user Mary Smith is granted access to her friend Lisa Tan's Assets. She clicks "Photos" 1201 to view Lisa's photos that are placed in default folder "General" 1202. Mary decides to arrange Lisa's photos for Lisa by creating different categories of folders, such as "Trip to England", "Birthday", Christmas Party", etc., through functional button "Add Folder" 1206. These folders are shown in a directory similar to email folders in a navigation panel, such as the one shown on the left side of FIG. 12. Mary can click "General" folder 1202 and drag and drop photos inside the general folder to the applicable folders, or right click each photo and send it to the applicable folder through selection from a menu displayed upon right clicking.

The system is configured so that Mary has no authority to delete any of Lisa's photos or move Lisa's photos out of Lisa's HotTerrain account unless authorized by Lisa to do so. Mary can select photo folders she created for Lisa and press "Send Folders for Approval" button 1209 to request Lisa to approve relocating photos from the "General" folder to specific folders or to make copies of photos and place them in the respective folders. Similar to what's elaborated in the patent application Ser. No. 12/154,241, Mary can select Lisa's photo folder(s), click on "Photo Album Template" 1203 to select a photo album to convert photos in a folder into the album, preview the photo album selected by pressing "Preview Photo Album" 1204, save the photo album with photos inside by pressing "Save Photo Album" 1205. Mary can also click on "Print Photo Album" 1207 to print out selected Lisa's Photo Album(s) as a gift to Lisa, or click on "Solicit Sponsorship" 1208 to request/solicit sponsorship from individuals and entities to obtain or buy the selected Lisa's Photo Album(s) that maybe professionally designed, high quality and fee-based.

In another embodiment, Lisa has the option of making her photos (or her eStamps and other Assets) public to allow other users to arrange her photos or other assets for free or for fee (e.g. charging HT Money). If other users arrange Lisa's photos for free, Lisa has the option of sending/donating certain amount of HT Money or items on HotTerrain to those users as appreciation. For the fee-based services, if Lisa is not satisfied with the service, she can give negative feedback to the user(s) who arranged her photos or other Assets.

Figure 13:
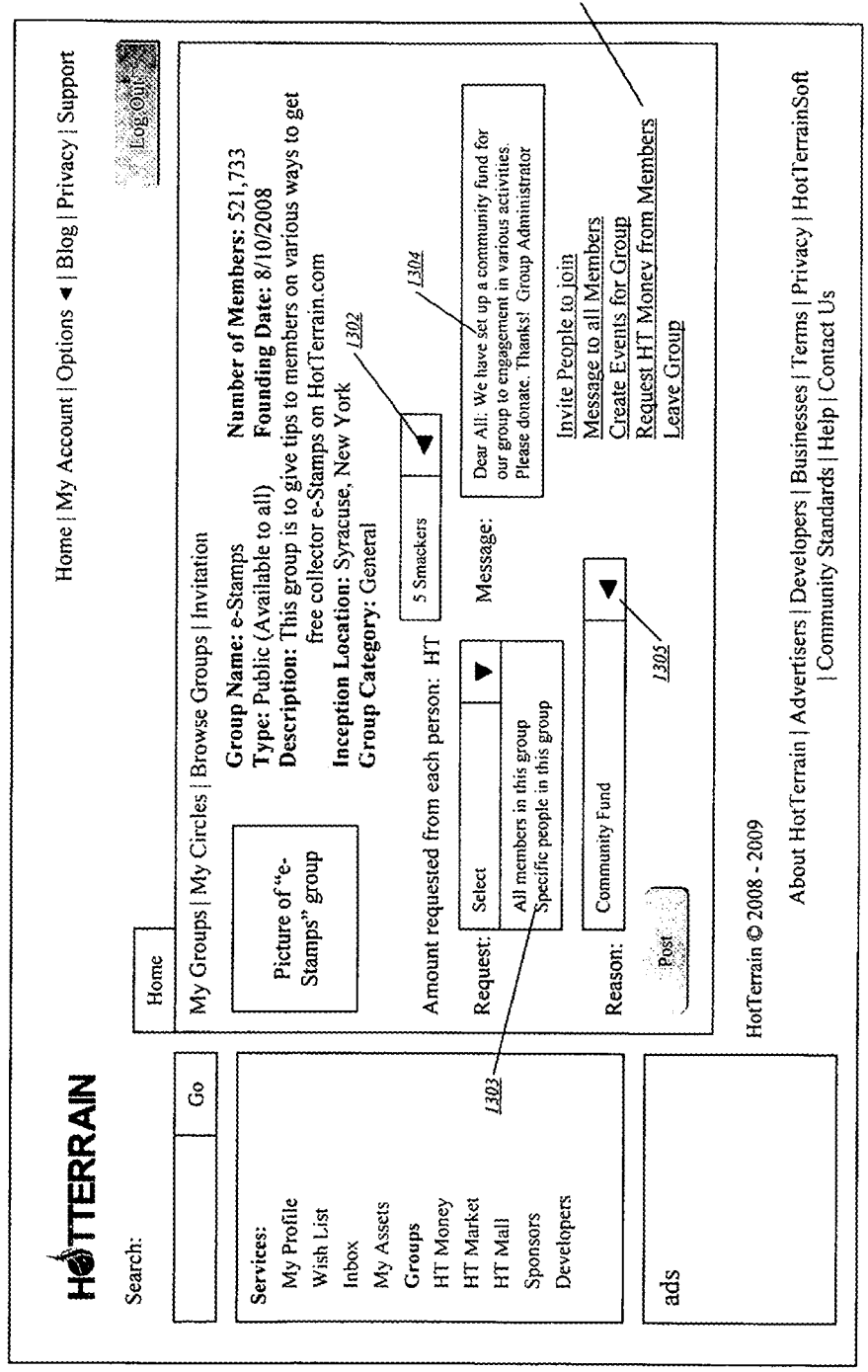
FIG. 13 is an exemplary illustration depicting functions to enable users to set-up community funds.

Referring to FIG. 13, therein is presented an exemplary illustration of one embodiment of our invention to enable users to setup community funds. As indicated, an exemplary group called "e-Stamps" has 521,733 members. The group administrators (or committee members/officers) decide to setup a community fund for users of this group. A group administrator clicks on "Request HT Money from Members" link 1301 and the screen similar to FIG. 13 appears to allow the administrator select the amount of donation from each member by clicking on selection menu 1302. The administrator can also select to request from all group members or specific members as shown at 1303. The administrator has options of inputting a message as shown at 1304 and selecting "Community Fund" as the reason for requesting donation by clicking selection menu 1305.

Once the request is sent out, a recipient can simply click on a "donate" button (not shown) to donate the amount requested and has an option to donate more, less or do nothing. Some groups can make member donation to community funds a prerequisite for joining those groups. And some groups can terminate memberships of certain users if they provide no donations for a certain period of time. Other groups may require no community funds at all. HotTerrain may be configured to only allow group administrators (or committee members/officers) to setup community funds. The information regarding donations to a community fund of a group and the spending activities of the fund is viewable to all group members to ensure transparency and to prevent embezzlement of the fund.

Figure 14:
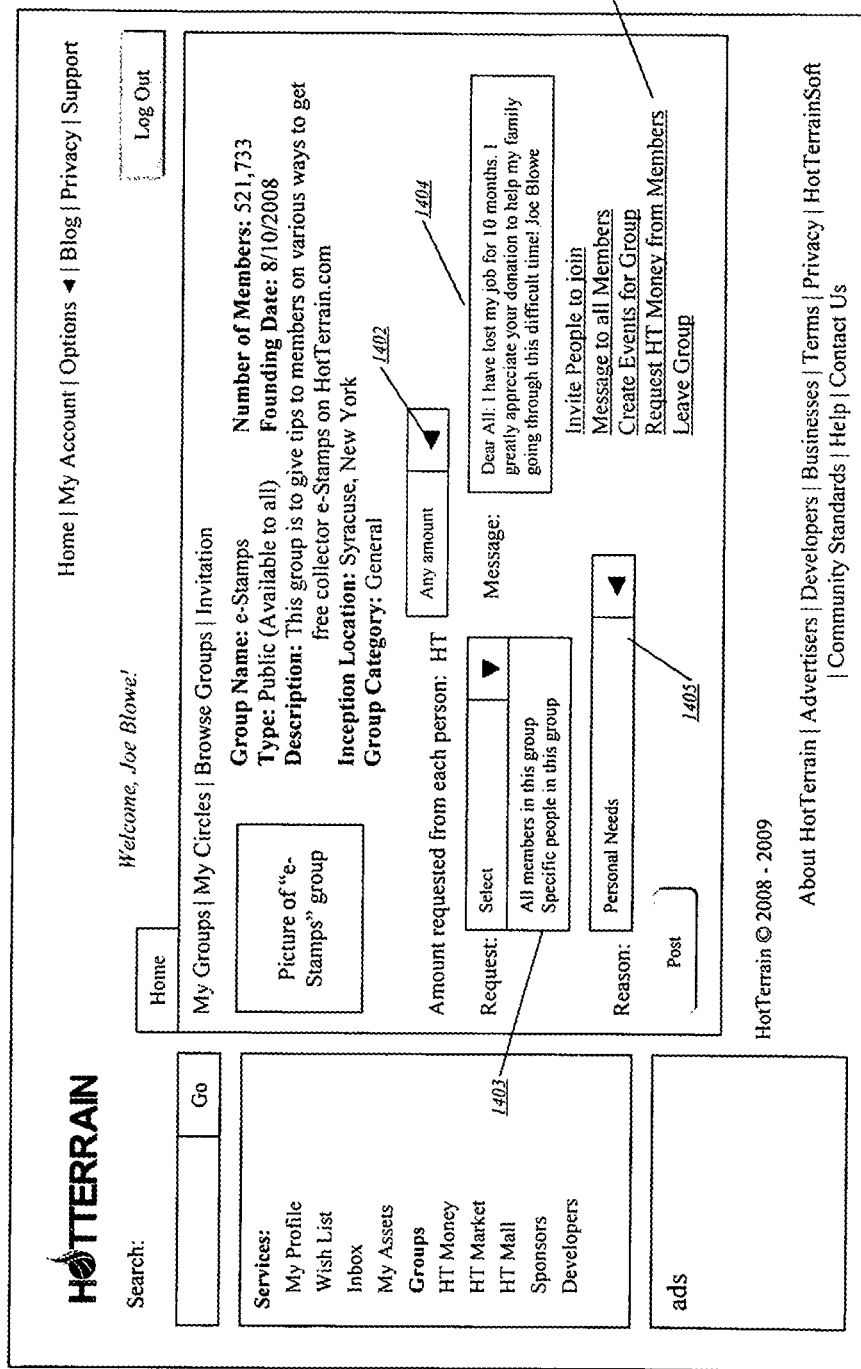
FIG. 14 is an exemplary illustration of enabling users to request digital money from community members.

With reference to FIG. 14, therein is depicted an exemplary illustration of one embodiment of our invention to enable users to request digital money from community members. As indicated, user Joe Blowe of the exemplary group "e-Stamps" needs some help from his group members. He clicks on "Request HT Money from Members" link 1401 and the screen similar to FIG. 14 appears to allow him to select the amount of donation from each member by clicking on selection menu 1402. The user can also select to request from all group members or specific members as shown at 1403. The user has options of inputting a message as shown at 1404 and selecting "Personal Needs" as the reason for requesting donation by clicking selection menu 1405.

Similarly, once the request is sent out, a recipient can simply click on a "donate" button (not shown) to donate the amount requested (in this case, the amount of his liking), reject the request, or do nothing. If donated, the amount is subtracted from the recipient's HT Money account and deposited to Joe Blowe's HT Money account.

Figure 15:
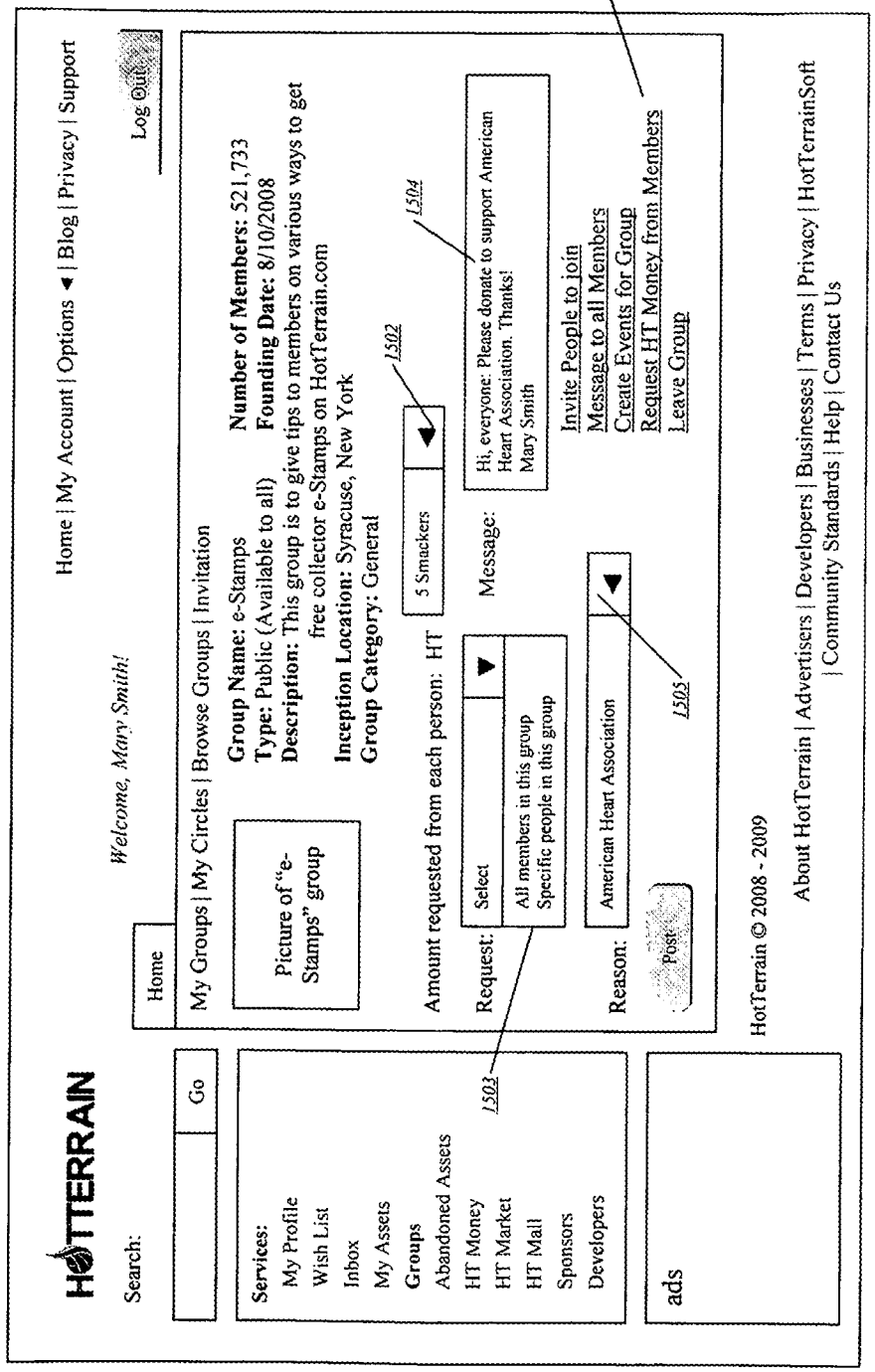
FIG. 15 is an exemplary illustration of one embodiment of present invention for a user to request/donate digital money to charities.

Now, referring to FIG. 15, therein is depicted a further illustration of one embodiment of our invention to enable users to request/donate digital money to charities in addition to patent application Ser. No. 12/154,241. As indicated, user Mary Smith of the exemplary group "e-Stamps" wants to help the American Heart Association. She clicks on "Request HT Money from Members" link 1501 and the screen similar to FIG. 15 appears to allow her to select the amount of donation from each member by clicking on selection menu 1502. She can also select to request from all group members or specific members as shown at 1503. The user has options of inputting a message as shown at 1504 and selecting "American Heart Association" as the reason for requesting donation by clicking selection menu 1505.

Similarly, once the request is sent out, a recipient can simply click on a "donate" button (not shown) to donate the amount requested, donate more or less, reject the request, or do nothing. If donated, the amount is subtracted from the recipient's HT Money account and deposited in the American Heart Association's HT Money account. The system also shows the total amount of fund raised by Mary Smith for the American Heart Association and donors' contribution information to all community members. HotTerrain performs background checks and verification when charity organizations setup their HotTerrain accounts to ensure the legitimacy of those charity accounts and to prevent fraudulent activities by malicious individuals.

Figure 16:
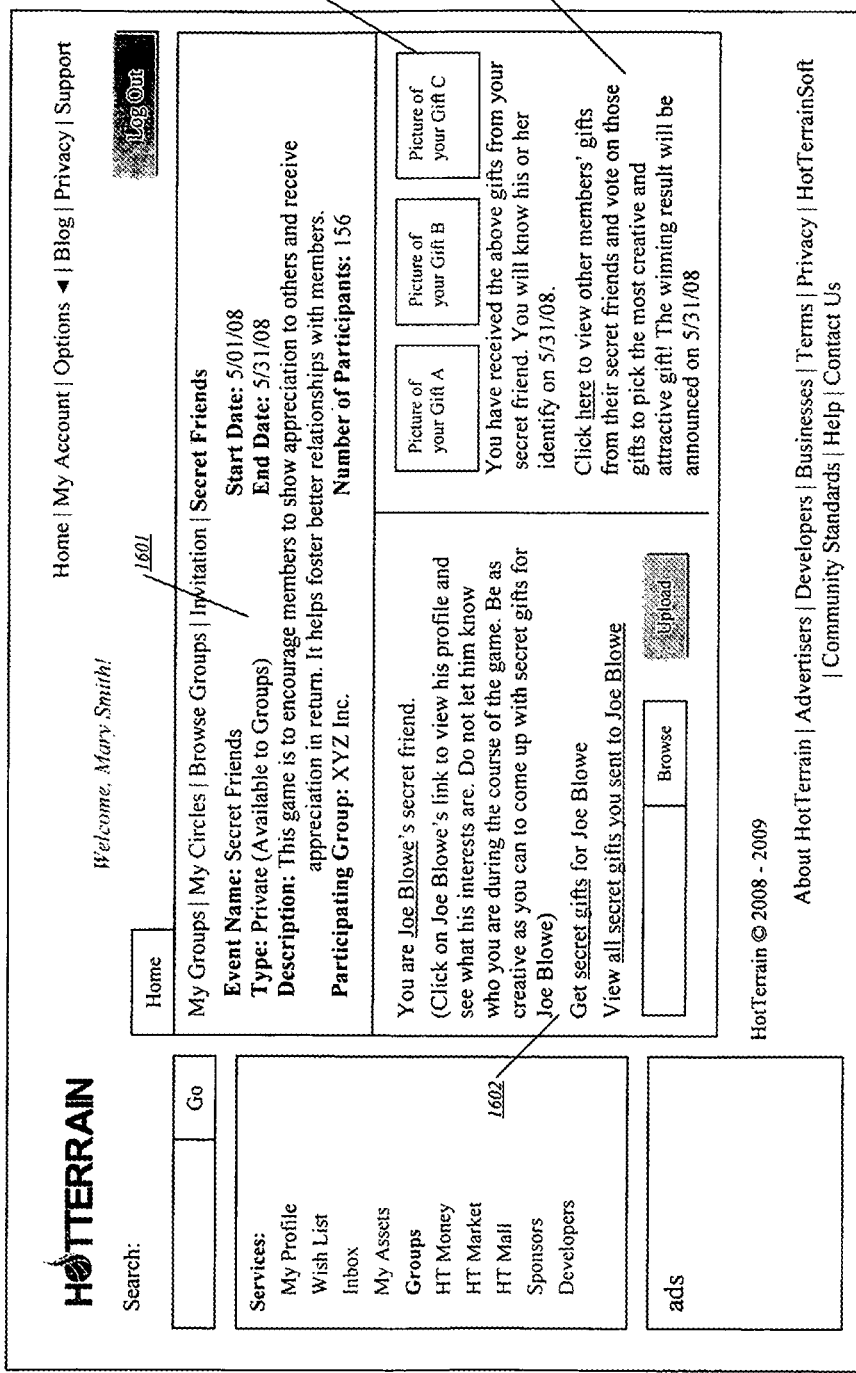
FIG. 16 is an exemplary illustration of online Secret Friends event.

With reference now to FIG. 16, therein is depicted an exemplary illustration of one embodiment of our invention to enable online community members to foster better relationships and dynamic interactions with others through online events, such as "Secret Friends". As indicated, members of XYZ Inc. enroll in a month-long "Secret Friends" program as shown at 1601. The system automatically assigns a secret friend to each user whereby the user doesn't know who his or her secret friend is until the end of the event. As depicted at 1602, user Mary Smith is informed that she is user Joe Blowe's secret friend and she is obligated to keep this as a secret. During the course of the event, she can get digital and physical gifts on HotTerrain to Joe Blowe and Joe Blowe only receives the gifts without knowing who provides them. If Mary provides gifts obtained outside of HotTerrain (e.g., gift made by herself), she can upload the pictures of them, input information about them and send them to Joe Blowe without identifying herself.

Similarly, Mary Smith can view gifts sent by her secret friend as shown at 1603. She can also view other members' received gifts from their secret friends and give ratings to those gifts as shown at 1604, just like others can view and vote on her received gifts. At the end of the event (event duration is configurable by XYZ Inc. members/administrators/officers during event enrollment), every member will know who his or her secret friend is and who wins the award of most creative gift and the like.

Another example of a group event that can foster better relationships and dynamic interactions among members is a Charity Cash-Clash competition to pool funds from members in a fun way to achieve better donation results and efficient donation event management. Members of a group are being put into several teams and each team is assigned a digital container. Members can exchange digital coins and digital bills using their HT Money or through online purchasing. Each team member's mission is to contribute digital pennies and one-dollar digital gold coins (earn positive points) to the team's container and "sabotage" the other teams by adding digital silver coins and bills (earn negative points) to other teams' containers. The team with the highest positive points for its container wins and all donations collected from the entire group can be donated to a charity. Other group events that help group members to foster deeper relationships were elaborated in patent application Ser. No. 12/154,241.

Referring to FIG. 17, therein is presented an exemplary illustration of one embodiment of our invention to implement group and role-based security to our proposed online networking and e-commerce site. As indicated, when a user sets up his HotTerrain account, he is presented with an option to invite others to join HotTerrain to earn additional digital money. The user can invite family members as shown at 1701 and these individuals may have "Top Secret" permission to view the user's HotTerrain account information (e.g., view the user's profile information and wish list) by default if they join HotTerrain. They are placed in the user's inner circle by default, wherein individuals in this circle have "Top Secret" permission.

The user can invite close friends to join HotTerrain as shown at 1702 and these individuals may also have "Top Secret" view of the user's HotTerrain account information by default if they join HotTerrain and are placed in the user's inner circle by default. The user can also invite others, such as co-workers, acquaintances and community members to join HotTerrain as sown at 1703 and these individuals may have "Secret" (e.g., view the user's partial profile and partial wish list information) and "Public" view (e.g., view the user's publicly available information) of the user's HotTerrain account information by default if they join HotTerrain and are placed in the user's medium and outer circles by default, wherein individuals in the medium circle have "Secret" permission and individuals in the outer circle have "Public" permission. The group and role-based security also applies to individuals on HotTerrain whom are invited by the user as his connections and vice versa. The user can change the default setting at any time by moving his invitees and inviters to different circles to change their access authority to his information.

Once filling out the invitees' email addresses, the user can click on "Send Invite" button 1704 to send out the invitation. The system performs edit checks to find out whether some of these invitees have already established accounts with HotTerrain and informs the user accordingly. The system also enables the user to bring their address books from other websites and present such email addresses to the user for him to decide whom to invite. The user has the option of inputting relationships (e.g., father, mother, brother, close friend, co-worker, etc.) to have the system automatically place those individuals in the applicable circles. If no relationship information is provided, those individuals are placed in the users' outer circle and the user needs to manually move them to the correct circles later on. As shown on FIG. 17, the user also has options of skipping the invitation step during his registration process by pressing link 1705 and inviting individuals later by clicking a "Invite Friends/Family" link inside his HotTerrain account.

With reference to FIG. 18, therein is depicted an exemplary illustration of one embodiment of our invention to enable joint payment methods. As illustrated on FIG. 7, user Mary Smith sends out joint fulfillment request to her friends to fulfill her friend Linda's wish for a Stone Mountain Capetown Shoulder Bag. Assuming the seller "Stone Mountain Inc." accepts all payment methods, Mary's friend Jim Cleaner approves Mary's request and proceeds to pay his portion of HT2,000 by using his HT Money; Similarly, Mary's friends Loraine Arsen and Tina Dai approves her request and pays their portion by using credit card and PayPal. The system automatically deducts their payment amount from the listed price and shows the Remaining Balance at 1801. As indicated in 1802, Mary's friend Joe Blowe has not responded to her request and there are 11 days left to her request expiration date. Mary has options to send him a reminder by clicking on the "Send Reminder" link, send him an auto-reminder through system configuration (e.g., send auto-reminder 7 days before expiration) or cancel her request to Joe Blowe. She can then request someone else to help or pay the remaining balance of $40 or HT4,000 by herself to fulfill Linda's wish. The system may display joint purchasing individuals by the order of their descending payment amount to the beneficiary.

As for Mary's portion shown at 1803, she can pay it any time before the expiration by clicking on the "Pay Now" link to select her preferred payment method to pay. The system lists physical addresses collected from Mary and her friends for Mary to select, such as Linda's address, Mary's address and her four friends addresses. Mary is responsible of providing the shipment address if it's not in the system. Some seller may demand full payment of the item before shipment; others may allow early shipment when certain amount of payment is collected to provide better customer service. If the seller is an individual, the payment methods are normally restricted to HT Money and PayPal to protect the buyer's sensitive information. Such joint payment methods on Wish Lists application or module also apply to joint purchasing on other HT applications and modules, such as HT Market, HT Mall, etc.

Referring to FIG. 19, therein is presented an exemplary illustration of one embodiment of our invention to enable users to acquire other users' free assets on HotTerrain for free. These free assets are items deleted by users on HotTerrain or their external items that they post to HotTerrain.com to be given away for free. As indicated, the Free Assets webpage includes but is not limited to Free eStamps 1901, Free eItems 1902 and Free Physical Items 1903. When users delete their HotTerrain emails with eStamps that are not "cut" or added to their Assets or when users delete certain eStamps in their Assets, these eStamps are automatically transferred to Free Assets under the eStamps category for any HotTerrain member to pick up for free. As shown in 1901, a user who is collecting eStamps (which may have corresponding physical stamps) can select multiple eStamps he is interested in and click on "Add to My Assets" button in 1901 to add those eStamps deleted by others to his Assets under e-Stamp folder.

Similarly, when users delete their eItems in HotTerrain.com, these eItems are automatically transferred to Free Assets under the eItems category for any HotTerrain member to pickup. As shown in 1902, a user who is collecting eItems (which may have corresponding physical items) can select multiple eItems he is interested in and click on "Add to My Assets" button in 1902 to add those eItems deleted by others to his Assets under e-Item folder. The system may be configured to limit the number of free eStamps and eItems one can pick up for a given time frame.

Users can also give out their physical items for free by deleting the image and information of them in their HotTerrain Assets application or by posting information about their external items on HotTerrain (e.g., through clicking "Post Free Assets" tab 1905 to post). Once posted, the information of these physical items is shown on HotTerrain that is accessible for all members to view, similar to what's depicted at 1903 and 1904. For the free item shown at 1903, user "Ubidu" drops the physical item at a local supermarket near him (assuming there is cooperation agreement between the supermarket and HotTerrain). An interested user can pick it up at the supermarket by providing his HotTerrain UID and the item is added to his Assets (the benefit to the supermarket is that the user may as well buy a few things while he is in the store). The user can also click on "Arrange Pickup" to reserve the item and to book a date for pickup. If he doesn't show up, the reservation is then canceled and the item is available for other interested members to pick up.

For the free item shown at 1904, user Steve Li still posses the Item. An interested individual can click on "Arrange Pickup" link to arrange a place to pick it up or pay shipping fee for Steve to ship the item to him. Once he pays the shipping fee, the item is automatically added to his Assets. Those skilled in the art will appreciate that the free assets information shown on FIG. 19 may be displayed on separate webpages.

Figure 20:
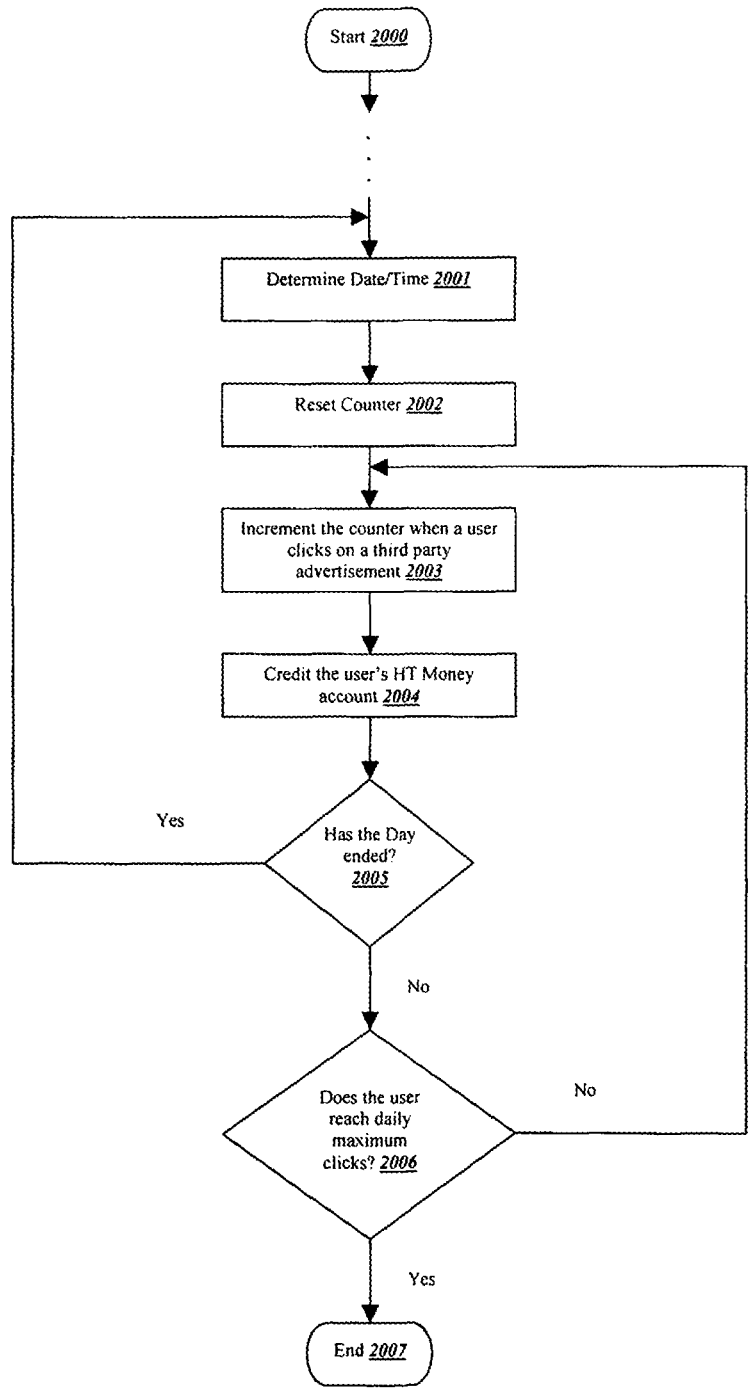
FIG. 20 is an exemplary flow chart illustrating the process of inserting user incentives into third party online advertisements.

Now, referring to FIG. 20, therein is depicted a high-level logic flowchart illustrating one embodiment of present invention to insert user incentives to third party online advertisements. As indicated, the process starts at step 2000 and the system performs whatever it needs to do (e.g., insert a third party web site script to display third party ads, such as Google Ad Sense) to arrive at step 2001 whereby the system determines date and time of the start of a day (e.g., 00:00:00 UTC) and then resets the counter at step 2002. Next, the HotTerrain system detects a third party advertisement is clicked by a user, it automatically increments the counter to count the click at step 2003.

Then, the system automatically adds a specified amount of digital money (e.g., HT1 per click) to the user's HT Money account as shown at step 2004. A determination is then made as to whether at that point of time, the day has ended (e.g., passing 12:00 am) for the user's time zone. If yes, the process goes back to step 2001 to determine the new Date and time, and then repeat the same steps of 2002 to 2004. If the day has not ended for the user's time zone, the system makes another determination as to whether the user has reached daily maximum clicks (e.g., 10 clicks per day) at step 2006. If yes, the system stops crediting that user's HT Money account for his further clicks of third party advertisements on that day. If he has not reached his daily maximum, the process goes back to step 2003 to continue to count his clicks on third party advertisements and deposit the associated HT Money to his HT money account. The process continued until the user reaches his daily maximum and the process ends at step 2007.

Figure 21:
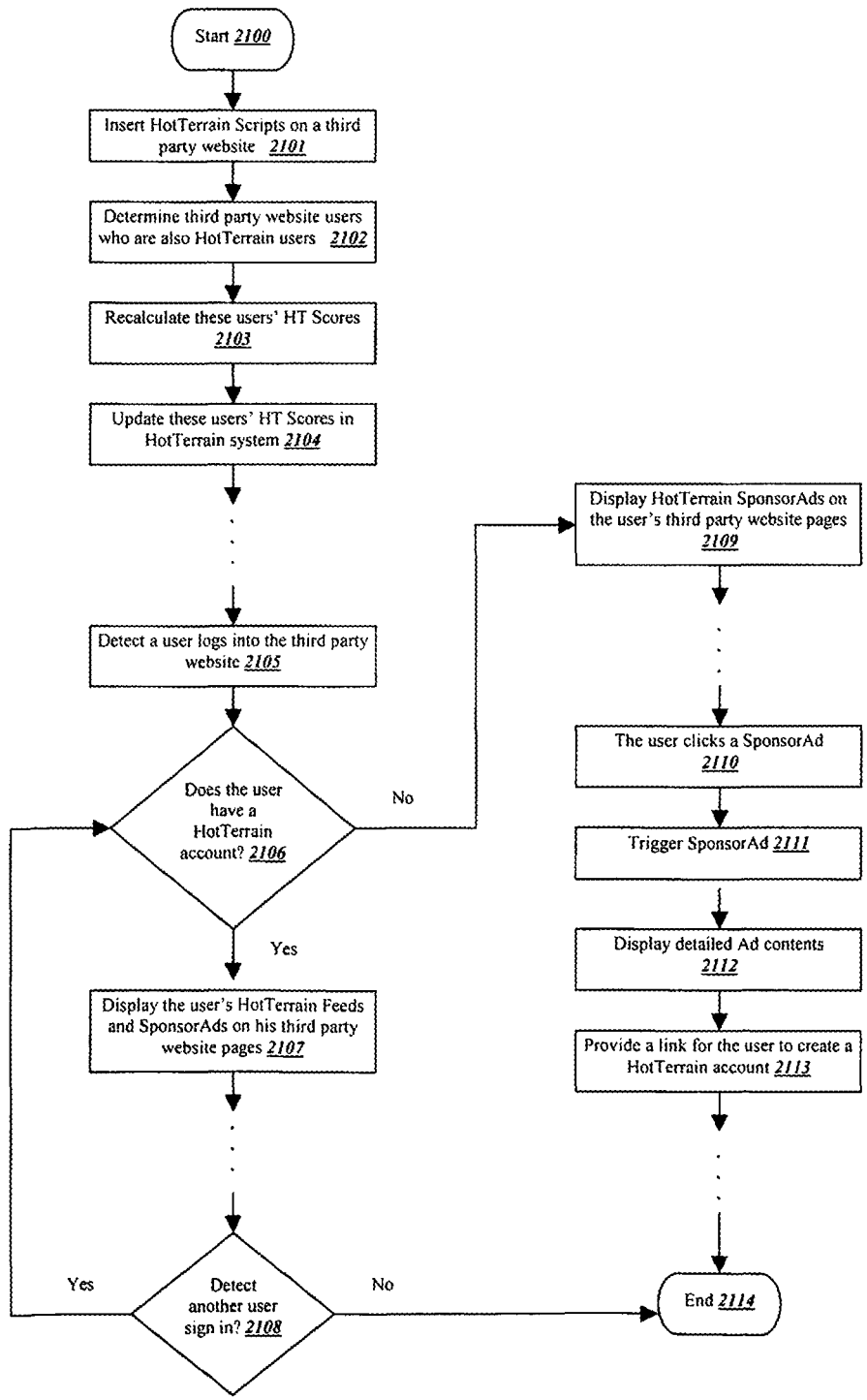
FIG. 21 is an exemplary flow chart illustrating the process of integrating present invention functions into other websites.

With reference to FIG. 21, therein is depicted an exemplary flow diagram depicting one embodiment of our invention to enable other websites to integrate HotTerrain programs to benefit from the unique methods and functions of the present invention. As indicated, the process starts at step 2100, followed by a third party website inserting HotTerrain scripts into its source code as depicted at step 2101. Upon the third party website completing such integration, HotTerrain system then automatically determine if some of the third party websites' users are also HotTerrain users at step 2102. This is accomplished by: 1) comparing user email addresses maintain at both sides to identified the matching email addresses; or 2) user login information to their other website(s) provided by users to HotTerrain or vice versa so that system interfacing can occur between HotTerrain and other website(s) to identify users with accounts on both websites. Once such users are found, HotTerrain system automatically recalculates these users' HT Scores by taking into account their activities on the third party websites, including but not limited to membership level, size of communities, available advertising space, level of activeness and prior purchasing activities on the third party websites.

The system then performs whatever it needs to do until its embedded scripts detect a user signs into the third party website at step 2105. A determination is then made to identify whether the user has a HotTerrain account at step 2106. If yes, the scripts are executed to display the user's HotTerrain Feeds and SponsorAds (see SponsorAds examples in 1101 on FIG. 11) on the user's third party website pages at step 2107. The system then allows the user to proceed to perform whatever he needs to do, including using various functionalities of HotTerrain through the links displayed on his third party web pages. Next, another determination is made to detect if another user sign in at step 2108. If yes, then the process goes back to step 2106. If there is no more user signs into the third party website, the process ends at step 2114.

If a user signs in the third party website does not have a HotTerrain account at step 2106, the scripts are executed to display HotTerrain SponsorAds on the user's third party web site pages at step 2109. Then the system allows the user to perform whatever he needs to do until he clicks a SponsorAd at step 2110. Once the system detects a SponsorAd is click by the user, it triggers SponsorAd at 2111 and display the detailed SponsorAd contents (e.g., similar to 1003 and/or 1004 of FIG. 10) to the user at step 2112. The display also contains links for the user to create a HotTerrain account as depicted at step 2113 to enable the user to benefit from HotTerrain system, such as earning digital money, share in online advertising dollars, request/solicit sponsorship, fulfill wishes, and joint purchasing, etc. Next, the system allows the user to perform whatever he needs to do (e.g. continue to use the third party website and/or create a HotTerrain account to start using its unique functions) and the process ends at step 2114.

Figure 22:
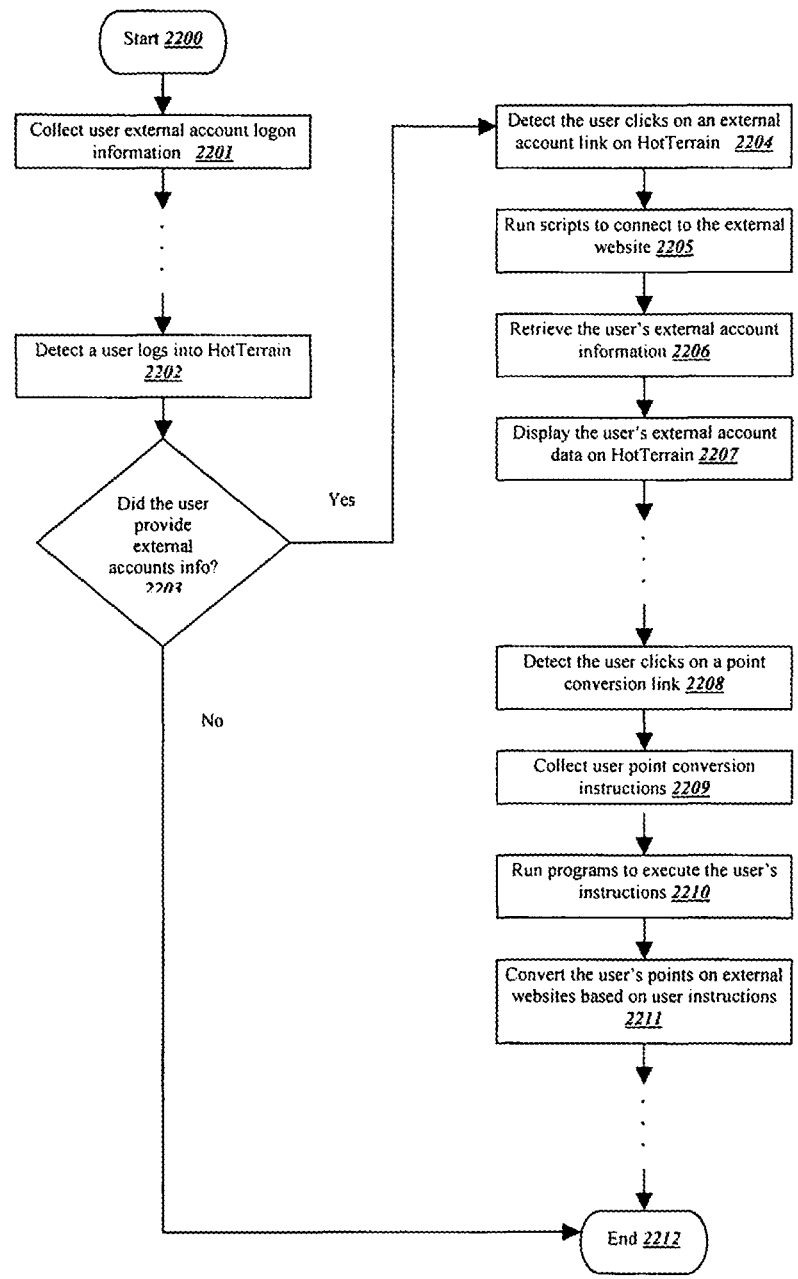
FIG. 22 is an exemplary illustration of a user managing external website accounts through HotTerrain.com.

Now, referring to FIG. 22, therein is depicted a high-level logic flowchart illustrating one embodiment of present invention for a user to manage multiple external website accounts through HotTerrain.com. As indicated, the process starts at step 2200, followed by the present invention system collecting users' external account logon information as depicted at step 2201. Then, the system does whatever it needs to do until it detects a user logs into the system at step 2202. The HotTerrain system then automatically determines if the user had provided his external accounts logon information to HotTerrain. If yes, the system detects the user clicks on one of his external account link on his HotTerrain account as shown at step 2204. Upon such detection, the system automatically runs scripts to connect to the user's external website at step 2205, and then retrieve the user's external account information at 2206. Next, the system displays the user's external account data on the user's HotTerrain account as shown at step 2207.

It will be apparent to those skilled in the art that another embodiment of the present invention is to consolidate the user's multiple external account information through HotTerrain.com so that the user can easily view his external accounts at a centralized location on HotTerrain. Such consolidated information includes and is not limited to the user's multiple email accounts, multiple hotel reward accounts, multiple airline mileage accounts, multiple gift card accounts, multiple back accounts and multiple credit card accounts. And the user can access those external accounts to use their various functions directly from HotTerrain without the need to log into those accounts.

Next, the system detects the user clicks on a point conversion link to convert his external points (e.g., hotel reward points, airline mileage points, gift card points, etc.) into HotTerrain digital money or into points accepted by his external web site companies as shown at step 2208. Once a click on the conversion link is detected, the system collects the users' point conversion instructions at step 2209, such as convert hotel reward points to HT Money, convert one hotel's reward points to another hotel's reward points, convert hotel reward points to airline mileage points, convert gift points to HT Money, hotel reward points or airline mileage points, etc. Next, the system runs programs to execute the user's specific instructions for his point conversion at step 2210 and convert the users' points on external websites based on the user's specific instructions at shown at step 2211. The system then does whatever it needs to perform and the process ends at step 2212. Also, going back to step 2203, if the user did not provide his external account information to HotTerrain.com, the process of managing the user's external accounts does not occur.

We claim:

1. A computer implemented method, executable by a computer system residing on at least one server, for transforming traditional online wish lists into dynamic wish fulfillment modules or applications and for transforming assets residing in accounts associated with other users into interactive assets accessible by an account associated with an user to increase online purchasing volume, address low membership reach rates of websites and poor online advertising response rates, said method comprises the steps of:

providing functions for an account associated with an initiating user to request sponsorship from at least one account associated with at least one entity to fulfill at least one wish item of a wish list residing in said account associated with said initiating user, or to fulfill at least one wish item of a wish list residing in another account associated with another user, wherein said account associated with said initiating user is authorized by said another account to access at least one wish item or wish list associated with said another account;

providing functions for an account associated with an initiating user to request sponsorship from at least one account associated with at least one individual to fulfill at least one wish item of a wish list residing in said account associated with said initiating user, or to fulfill at least one wish item of a wish list residing in another account associated with another user, wherein said account associated with said initiating user is authorized by said another account to access at least one wish item or wish list associated with said another account; and providing functions to verify charity members' authenticities such that wish items residing in accounts associated with said charity members is fulfilled by accounts associated with Internet users; and providing functions for an account associated with an user to arrange assets residing in at least one other account associated with at least one other user, wherein said account associated with said user is authorized by said at least one other account to access at least one asset residing in said at least one other account;

wherein providing functions for an account associated with an user to arrange assets residing in accounts associated with other users, said account associated with said user is authorized by said accounts associated with said other users to access at lease one asset residing in each account associated with each other user, and said method further comprises the steps of:

automatically enabling said account associated with said user to access asset information of another account associated with another user via group and role-based security settings;

automatically enabling another account associated with another user to grand access to asset information of said another account to said account associated with said user;

automatically enabling said account associated with said user to create at least one folder on said another account associated with said another user to hold digital and physical assets of said another account;

automatically enabling said account to design, edit or convert said folder into an album to hold digital and physical assets of said another account;

automatically enabling said another account to approve asset arrangement work performed by said account associated with said user upon receiving work completion data;

automatically preventing said account associated with said user to delete or move an asset or assets of said another account without approval from said another account associated with said another user; and providing functions for said another account to compensate said account for arranging assets of said another account.

2. The method of claim 1 further comprises the steps of:

providing functions for said account associated with said initiating user to choose multiple individuals, entities, groups and a deadline for response, inputting messages, previewing said request, and the like, for a fulfillment of a wish item, wish items or a wish list;

providing said account associated with said initiating user to independently fulfill said at least one wish item;

providing functions for said account associated with said initiating user to solicit or request accounts associated with said individuals, entities, groups for said wish fulfillment; and automatically including online wish fulfillment and asset arrangement activities of said accounts associated with said initiating user, said at least one individual and said user, in user accumulated score calculation to increase user accumulated scores of said accounts.

3. The method of claim 1, wherein providing functions for an account associated with an initiating user to request sponsorship from at least one account associated with at least one entity for wish fulfillment further comprises the steps of:

automatically approving said request upon determining user accumulated score and requested sponsorship amount of said account associated with said initiating user meets minimum sponsorship score and maximum user sponsorship amount of said account associated with said entity;

automatically providing alternative entity sponsor list by said computer system through system comparison to identify qualified alternative entity sponsors wherein said system retrieving stored minimum sponsorship score requirements of entity sponsors and identifies said minimum sponsorship score requirements associated with said qualified alternative entity sponsors that are equal to or less than said user's score and wherein said system retrieving stored user sponsorship amounts associated with entity sponsors and identifies said user sponsorship amounts associate with said qualified alternative entity sponsors that are equal to or greater than sponsorship amount requested by said user;

automatically providing functions by said computer system for said account associated with said initiating user to select at least one sponsoring entity from said alternative entity sponsor list, wherein qualification of sponsorship of said account associated with said initiating user is automatically displayed to aid an entity selection or entity selections by said account associated with said initiating user;

automatically deducting or reserving said sponsoring amount from said account associated with said at least one entity selected;

automatically sending said sponsorship amount to said account associated with said initiating user by subtracting said sponsoring amount from the listed price of said at least one wish item;

automatically displaying online advertisements of said account associated with said at least one entity on webpages associated with said initiating user to increase online advertisement impressions, click-through rate, conversion rate and the like from clicks or presses received from accounts connected to said account associated with said initiating user, wherein said webpages is displayed on all display devices, including computers, laptops, netbooks, mobile phones, hand-held devices, and the like;

providing functions for said account associated with said initiating user to complete said wish fulfillment;

releasing joint wish fulfillment information to said another account associated with said another users based on system configurations and instructions provided by said account associated with said initiating user; and automatically arranging delivery of said wish item to said appropriate destination based on system configurations and instructions provided by said account associated with said initiating user, wherein said destination is a digital or physical location.

4. The method of claim 1, wherein providing functions for an account associated with an initiating user to request sponsorship from at least one account associated with an individual for wish fulfillment further comprises steps of:

collecting information and instructions provided by said account associated with said initiating user for said wish fulfillment request through all input devices, including keyboard, microphone, touch screen, mouse, or the like;

providing functions for said account associated with said individual to approve, reject or ignore said request from said account associated with said initiating user;

providing reminder functions to inform said accounts associated with said initiating user and said individual about said deadline that is approaching;

automatically deducting or reserving said sponsoring amount from said account associated with said individual upon receiving approval from said account associated with said individual;

automatically subtracting said sponsoring amount from the listed price of said at least one wish item residing in said account associated with said initiating user or with said another user;

automatically displaying online advertisements of said individual on webpages associated with said initiating user to increase online advertisement impressions, click-through rate, conversion rate and the like from clicks and presses received from accounts connected to said account associated with said initiating user, wherein said webpages is displayed on all display devices, including computers, laptops, netbooks, mobile phones, hand-held devices, and the like;

providing functions for said account associated with said initiating user to complete the purchasing process;

releasing joint wish fulfillment information to said another account associated said another user based on system configurations and instructions provided by said account associated with said initiating user; and automatically arranging delivery of said wish item to said appropriate destination based on system configurations and instructions provided by said account associated with said initiating user, wherein said destination is a digital or physical location.

5. The method of claim 4, wherein said individual rejects or ignores said wish fulfillment request of said account associated with said initiating user further comprises the steps of:

providing functions for said account associated with said initiating user to withdrawal or delete said wish fulfillment request; and providing functions for said account associated with said initiating user to select at least one other account associated with at least one other individual for wish fulfillment after said first request is sent or after receiving a rejection from said account associated with said first individual.

6. The method of claim 1, wherein transforming traditional online wish lists into dynamic wish fulfillment modules or applications, said method further comprised comprises the steps of:

automatically comparing by said computer system user accumulated score of an account associated with an user to stored minimum sponsorship score requirements of entity sponsors and identifying at least one account associated with at least one entity with a minimum sponsorship score requirement that is equal to or less than said user accumulated score of said account associated with said user;

automatically providing entity sponsor list by said computer system that shows at least the following information: a) said at least one account associated with said at least one entity is offering certain amount of sponsorship to voluntarily help said account associated with said user to obtain at least one wish item of a wish list associated with said user account or associated with another user account, wherein said wish list is accessible to said account associated with said user, and b) if said sponsorship amount is accepted by said account associated by said user, at least one online advertisement of said at least one account associated with at least one entity will be displayed on webpages associated with said user;

automatically deducting or reserving said sponsoring amount from said account associated with said entity upon receiving a sponsorship acceptance click or press from said account associated with said user;

automatically sending said sponsorship amount to said account associated with said user by subtracting said sponsoring amount from the listed price of said at least one wish item;

automatically displaying online advertisements of said account associated with said entity on webpages associated with said user to increase online advertisement impressions, click-through rate, conversion rate and the like from clicks and presses received from accounts connected to said account associated with said user, wherein said webpages is displayed on all display devices, including computers, laptops, netbooks, mobile phones, hand-held devices, and the like;

providing functions for said account associated with said initiating user to complete the purchasing process;

releasing joint wish fulfillment information to said another account associated said another user based on system configurations and instructions provided by said account associated with said initiating user; and automatically arranging delivery of said wish item to said appropriate destination based on system configurations and instructions provided by said account associated with said initiating user, wherein said destination is a digital or physical location.

7. A system residing on at least one server for transforming traditional online wish lists into dynamic wish fulfillment modules or applications and for transforming assets residing in accounts associated with other users into interactive assets accessible by an account associated with an user to increase online purchasing volume, address low membership reach rates of websites and poor online advertising response rates, said system further comprising:

at least one processing unit;

at least one input device connected to said processing unit;

at least one display device connected to said processing unit;

at least one database connected to said processing unit;

at least one communication link connected to the Internet;

said processing unit, responsive to instructions from said computer system and programmed to perform the following:

means for providing functions for an account associated with an initiating user to request sponsorship from at least one account associated with at least one entity to fulfill at least one wish item of a wish list residing in said account associated with said initiating user, or to fulfill at least one of other wish items in another account associated with another user, wherein said account associated with said initiating user is authorized by said another account to access at least one wish item or wish list associated with said another account;

means for providing functions for an account associated with an initiating user to request sponsorship from at least one account associated with at least one individual to fulfill at least one wish item of a wish list residing in said account associated with said initiating user, or to fulfill at least one of other wish items in another account associated with another user, wherein said account associated with said initiating user is authorized by said another account to access at least one wish item or wish list associated with said another account; and means for providing functions to verify charity members' authenticities such that wish items residing in accounts associated with said charity members is fulfilled by accounts associated with Internet users; and means for providing functions for an account associated with an user to arrange assets residing in at least one other account associated with at least one other user, wherein said account associated with said user is authorized by said at least one other account to access at least one asset residing in said at least one other account;

wherein means for providing functions for an account associated with an user to arrange assets residing in accounts associated with other users, said account associated with said user is authorized by said accounts associated with said other users to access at least one asset residing in each account associated with each other user, and said system further comprises:

means for automatically enabling said account associated with said user to access asset information of another account associated with another user via group and role-based security settings;

means for automatically enabling another account associated with another user to grand access to asset information of said another account to said account associated with said user;

means for automatically enabling said account associated with said user to create at least one folder on said another account associated with said another user to hold digital and physical assets of said another account;

means for automatically enabling said account to design, edit or convert said folder into an album to hold digital and physical assets of said another account;

means for automatically enabling said another account to approve asset arrangement work performed by said account associated with said user upon receiving work completion data;

means for automatically preventing said account associated with said user to delete or move an asset or assets of said another account without approval from said another account associated with said another user; and means for providing functions for said another account to compensate said account for arranging assets of said another account.

8. The system of claim 7 further comprises the steps of:

means for providing functions for said account associated with said initiating user to choose multiple individuals, entities, groups and a deadline for response, inputting messages, previewing said request, and the like, for a fulfillment of a wish item, wish items or a wish list;

means for providing said account associated with said initiating user to independently fulfill said at least one wish item;

means for providing functions for said account associated with said initiating user to solicit or request accounts associated with said individuals, entities, groups for said wish fulfillment; and means for automatically including online wish fulfillment and asset arrangement activities of said accounts associated with said initiating user, said at least one individual and said user, in user accumulated score calculation to increase user accumulated scores of said accounts.

9. The system of claim 7, wherein providing functions for an account associated with an initiating user to request sponsorship from at least one account associated with at least one entity for wish fulfillment further comprises the steps of:

means for automatically approving said request upon determining user accumulated score and requested sponsorship amount of said account associated with said initiating user meets minimum sponsorship score and maximum user sponsorship amount of said account associated with said entity;

means for automatically providing alternative entity sponsor list by said computer system through system comparison to identify qualified alternative entity sponsors wherein said system retrieving stored minimum sponsorship score requirements of entity sponsors and identifies said minimum sponsorship score requirements associated with said qualified alternative entity sponsors that are equal to or less than said user's score and wherein said system retrieving stored user sponsorship amounts associated with entity sponsors and identifies said user sponsorship amounts associate with said qualified alternative entity sponsors that are equal to or greater than sponsorship amount requested by said user;

means for automatically providing functions by said computer system for said account associated with said initiating user to select at least one sponsoring entity from said alternative entity sponsor list, wherein qualification of sponsorship of said account associated with said initiating user is automatically displayed to aid an entity selection or entity selections by said account associated with said initiating user;

means for automatically deducting or reserving said sponsoring amount from said account associated with said at least one entity selected;

means for automatically sending said sponsorship amount to said account associated with said initiating user by subtracting said sponsoring amount from the listed price of said at least one wish item;

means for automatically displaying online advertisements of said account associated with said at least one entity on webpages associated with said initiating user to increase online advertisement impressions, click-through rate, conversion rate and the like from clicks or presses received from accounts connected to said account associated with said initiating user, wherein said webpages is displayed on all display devices, including computers, laptops, netbooks, mobile phones, hand-held devices, and the like;

means for providing functions for said account associated with said initiating user to complete said wish fulfillment;

means for releasing joint wish fulfillment information to said another account associated with said another users based on system configurations and instructions provided by said account associated with said initiating user; and means for automatically arranging delivery of said wish item to said appropriate destination based on system configurations and instructions provided by said account associated with said initiating user, wherein said destination is a digital or physical location.

10. The system of claim 7, wherein providing functions for an account associated with an initiating user to request sponsorship from at least one account associated with an individual for wish fulfillment further comprises the steps of:

means for collecting information and instructions provided by said account associated with said initiating user for said wish fulfillment request through all input devices, including keyboard, microphone, touch screen, mouse, or the like;

means for providing functions for said account associated with said individual to approve, reject or ignore said request from said account associated with said initiating user;

means for providing reminder functions to inform said accounts associated with said initiating user and said individual about said deadline that is approaching;

means for automatically deducting or reserving said sponsoring amount from said account associated with said individual upon receiving approval from said account associated with said individual;

means for automatically subtracting said sponsoring amount from the listed price of said at least one wish item residing in said account associated with said initiating user or with said another user;

means for automatically displaying online advertisements of said individual on webpages associated with said initiating user to increase online advertisement impressions, click-through rate, conversion rate and the like from clicks and presses received from accounts connected to said account associated with said initiating user, wherein said webpages is displayed on all display devices, including computers, laptops, netbooks, mobile phones, hand-held devices, and the like;

means for providing functions for said account associated with said initiating user to complete the purchasing process;

means for releasing joint wish fulfillment information to said another account associated said another user based on system configurations and instructions provided by said account associated with said initiating user; and means for automatically arranging delivery of said wish item to said appropriate destination based on system configurations and instructions provided by said account associated with said initiating user, wherein said destination is a digital or physical location.

11. The system of claim 10, wherein said individual rejects or ignores said wish fulfillment request of said account associated with said initiating user further comprises the steps of:

means for providing functions for said account associated with said initiating user to withdrawal or delete said wish fulfillment request; and means for providing functions for said account associated with said initiating user to select at least one other account associated with at least one other individual for wish fulfillment after said first request is sent or after receiving a rejection from said account associated with said first individual.

12. The system of claim 7, wherein transforming traditional online wish lists into dynamic wish fulfillment modules or applications, said system further comprises comprised the steps of:

means for automatically comparing by said computer system user accumulated score of an account associated with an user to stored minimum sponsorship score requirements of entity sponsors and identifying at least one account associated with at least one entity with a minimum sponsorship score requirement that is equal to or less than said user accumulated score of said account associated with said user;

means for automatically providing entity sponsor list by said computer system that shows at least the following information: a) said at least one account associated with said at least one entity is offering certain amount of sponsorship to voluntarily help said account associated with said user to obtain at least one wish item of a wish list associated with said user account or associated with another user account, wherein said wish list is accessible to said account associated with said user, and b) if said sponsorship amount is accepted by said account associated by said user, at least one online advertisement of said at least one account associated with at least one entity will be displayed on webpages associated with said user;

means for automatically deducting or reserving said sponsoring amount from said account associated with said entity upon receiving a sponsorship acceptance click or press from said account associated with said user;

means for automatically sending said sponsorship amount to said account associated with said user by subtracting said sponsoring amount from the listed price of said at least one wish item;

means for automatically displaying online advertisements of said account associated with said entity on webpages associated with said user to increase online advertisement impressions, click-through rate, conversion rate and the like from clicks and presses received from accounts connected to said account associated with said user, wherein said webpages is displayed on all display devices, including computers, laptops, netbooks, mobile phones, hand-held devices, and the like;

means for providing functions for said account associated with said initiating user to complete the purchasing process;

means for releasing joint wish fulfillment information to said another account associated said another user based on system configurations and instructions provided by said account associated with said initiating user; and means for automatically arranging delivery of said wish item to said appropriate destination based on system configurations and instructions provided by said account associated with said initiating user, wherein said destination is a digital or physical location.

13. A non-transitory computer-readable medium with instructions stored thereon for transforming traditional online wish lists into dynamic wish fulfillment modules or applications and for transforming assets residing in accounts associated with other users into interactive assets accessible by an account associated with an user to increase online purchasing volume, address low membership reach rates of websites and poor online advertising response rates, that when executed by at least one processor, perform steps comprising the steps of:

providing functions for an account associated with an initiating user to request sponsorship from at least one account associated with at least one entity to fulfill at least one wish item of a wish list residing in said account associated with said initiating user, or to fulfill at least one of other wish items in another account associated with another user, wherein said account associated with said initiating user is authorized by said another account to access at least one wish item or wish list associated with said another account;

providing functions for an account associated with an initiating user to request sponsorship from at least one account associated with at least one individual to fulfill at least one wish item of a wish list residing in said account associated with said initiating user, or to fulfill at least one of other wish items in another account associated with another user, wherein said account associated with said initiating user is authorized by said another account to access at least one wish item or wish list associated with said another account; and providing functions to verify charity members' authenticities such that wish items residing in accounts associated with said charity members is fulfilled by accounts associated with Internet users; and providing functions for an account associated with an user to arrange assets residing in at least one other account associated with at least one other user, wherein said account associated with said user is authorized by said at least one other account to access at least one asset residing in said at least one other account;

wherein providing functions for an account associated with an user to arrange assets residing in accounts associated with other users, said account associated with user is authorized by said accounts associated with said other users to access at least one asset residing in each account associated with each other user, and said method further comprises the steps of:

automatically enabling said account associated with said user to access asset information of another account associated with another user via group and role-based security settings;

automatically enabling another account associated with another user to grand access to asset information of said another account to said account associated with said user;

automatically enabling said account associated with said user to create at least one folder on said another account associated with said another user to hold digital and physical assets of said another account;

automatically enabling said account to design, edit or convert said folder into an album to hold digital and physical assets of said another account;

automatically enabling said another account to approve asset arrangement work performed by said account associated with said user upon receiving work completion data;

automatically preventing said account associated with said user to delete or move an asset or assets of said another account without approval from said another account associated with said another user; and providing functions for said another account to compensate said account for arranging assets of said another account.

14. The computer-readable medium of claim 13 further comprises the steps of:

providing functions for said account associated with said initiating user to choose multiple individuals, entities, groups and a deadline for response, inputting messages, previewing said request, and the like, for a fulfillment of a wish item, wish items or a wish list;

providing said account associated with said initiating user to independently fulfill said at least one wish item;

providing functions for said account associated with said initiating user to solicit or request accounts associated with said individuals, entities, groups for said wish fulfillment; and automatically including online wish fulfillment and asset arrangement activities of said accounts associated with said initiating user, said at least one individual and said user, in user accumulated score calculation to increase user accumulated scores of said accounts.

15. The computer-readable medium of claim 13, wherein providing functions for an account associated with an initiating user to request sponsorship from at least one account associated with at least one entity for wish fulfillment further comprises the steps of:

automatically approving said request upon determining user accumulated score and requested sponsorship amount of said account associated with said initiating user meets minimum sponsorship score and maximum user sponsorship amount of said account associated with said entity;

automatically providing alternative entity sponsor list by said computer system through system comparison to identify qualified alternative entity sponsors wherein said system retrieving stored minimum sponsorship score requirements of entity sponsors and identifies said minimum sponsorship score requirements associated with said qualified alternative entity sponsors that are equal to or less than said user's score and wherein said system retrieving stored user sponsorship amounts associated with entity sponsors and identifies said user sponsorship amounts associate with said qualified alternative entity sponsors that are equal to or greater than sponsorship amount requested by said user;

automatically providing functions by said computer system for said account associated with said initiating user to select at least one sponsoring entity from said alternative entity sponsor list, wherein qualification of sponsorship of said account associated with said initiating user is automatically displayed to aid an entity selection or entity selections by said account associated with said initiating user;

automatically deducting or reserving said sponsoring amount from said account associated with said at least one entity selected;

automatically sending said sponsorship amount to said account associated with said initiating user by subtracting said sponsoring amount from the listed price of said at least one wish item;

automatically displaying online advertisements of said account associated with said at least one entity on webpages associated with said initiating user to increase online advertisement impressions, click-through rate, conversion rate and the like from clicks or presses received from accounts connected to said account associated with said initiating user, wherein said webpages is displayed on all display devices, including computers, laptops, netbooks, mobile phones, hand-held devices, and the like;

providing functions for said account associated with said initiating user to complete said wish fulfillment;

releasing joint wish fulfillment information to said another account associated with said another users based on system configurations and instructions provided by said account associated with said initiating user; and automatically arranging delivery of said wish item to said appropriate destination based on system configurations and instructions provided by said account associated with said initiating user, wherein said destination is a digital or physical location.

16. The computer-readable medium of claim 13, wherein providing functions for an account associated with an initiating user to request sponsorship from at least one account associated with an individual for wish fulfillment further comprises the steps of:

collecting information and instructions provided by said account associated with said initiating user for said wish fulfillment request through all input devices, including keyboard, microphone, touch screen, mouse, or the like;

providing functions for said account associated with said individual to approve, reject or ignore said request from said account associated with said initiating user;

providing reminder functions to inform said accounts associated with said initiating user and said individual about said deadline that is approaching;

automatically deducting or reserving said sponsoring amount from said account associated with said individual upon receiving approval from said account associated with said individual;

automatically subtracting said sponsoring amount from the listed price of said at least one wish item residing in said account associated with said initiating user or with said another user;

automatically displaying online advertisements of said individual on webpages associated with said initiating user to increase online advertisement impressions, click-through rate, conversion rate and the like from clicks and presses received from accounts connected to said account associated with said initiating user, wherein said webpages is displayed on all display devices, including computers, laptops, netbooks, mobile phones, hand-held devices, and the like;

providing functions for said account associated with said initiating user to complete the purchasing process;

releasing joint wish fulfillment information to said another account associated said another user based on system configurations and instructions provided by said account associated with said initiating user; and automatically arranging delivery of said wish item to said appropriate destination based on system configurations and instructions provided by said account associated with said initiating user, wherein said destination is a digital or physical location.

17. The computer-readable medium of claim 16, wherein said individual rejects or ignores said wish fulfillment request of said account associated with said initiating user further comprises the steps of:

providing functions for said account associated with said initiating user to withdrawal or delete said wish fulfillment request; and providing functions for said account associated with said initiating user to select at least one other account associated with at least one other individual for wish fulfillment after said first request is sent or after receiving a rejection from said account associated with said first individual.

18. The computer-readable medium of claim 13, wherein transforming traditional online wish lists into dynamic wish fulfillment modules or applications, said method further comprises comprised the steps of:

automatically comparing by said computer system user accumulated score of an account associated with an user to stored minimum sponsorship score requirements of entity sponsors and identifying at least one account associated with at least one entity with a minimum sponsorship score requirement that is equal to or less than said user accumulated score of said account associated with said user;

automatically providing entity sponsor list by said computer system that shows at least the following information: a) said at least one account associated with said at least one entity is offering certain amount of sponsorship to voluntarily help said account associated with said user to obtain at least one wish item of a wish list associated with said user account or associated with another user account, wherein said wish list is accessible to said account associated with said user, and b) if said sponsorship amount is accepted by said account associated by said user, at least one online advertisement of said at least one account associated with at least one entity will be displayed on webpages associated with said user;

automatically deducting or reserving said sponsoring amount from said account associated with said entity upon receiving a sponsorship acceptance click or press from said account associated with said user;

automatically sending said sponsoring amount to said account associated with said user by subtracting said sponsoring amount from the listed price of said at least one wish item;

automatically displaying online advertisements of said account associated with said entity on webpages associated with said user to increase online advertisement impressions, click-through rate, conversion rate and the like from clicks and presses received from accounts connected to said account associated with said user, wherein said webpages is displayed on all display devices, including computers, laptops, netbooks, mobile phones, hand-held devices, and the like;

providing functions for said account associated with said initiating user to complete the purchasing process;

releasing joint wish fulfillment information to said another account associated said another user based on system configurations and instructions provided by said account associated with said initiating user; and automatically arranging delivery of said wish item to said appropriate destination based on system configurations and instructions provided by said account associated with said initiating user, wherein said destination is a digital or physical location.

\* \* \* \* \*